United States Patent
Hosseini et al.

(10) Patent No.: US 11,678,335 B2
(45) Date of Patent: Jun. 13, 2023

(54) UPLINK PREEMPTION INDICATION

(71) Applicant: QUALCOMM Incorporated, San Diego, CA (US)

(72) Inventors: Seyedkianoush Hosseini, San Diego, CA (US); Wanshi Chen, San Diego, CA (US); Chih-Ping Li, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 91 days.

(21) Appl. No.: 16/580,950

(22) Filed: Sep. 24, 2019

(65) Prior Publication Data

US 2020/0100226 A1 Mar. 26, 2020

Related U.S. Application Data

(60) Provisional application No. 62/736,448, filed on Sep. 25, 2018.

(51) Int. Cl.
*H04W 72/23* (2023.01)
*H04W 52/14* (2009.01)
(Continued)

(52) U.S. Cl.
CPC ......... *H04W 72/23* (2023.01); *H04W 52/146* (2013.01); *H04W 72/044* (2013.01); *H04W 72/56* (2023.01)

(58) Field of Classification Search
None
See application file for complete search history.

(56) References Cited

U.S. PATENT DOCUMENTS 10,285,028 B2   5/2019 Chincholi et al.
2018/0324816 A1* 11/2018 Islam .................... H04L 5/0053
(Continued)

FOREIGN PATENT DOCUMENTS

KR    20180026322 A    3/2018
WO    WO-2017136666 A1    8/2017
WO    WO-2018129325 A1    7/2018

OTHER PUBLICATIONS

Fujitsu: "Discussion on Uplink pre-emption Indication", 3GPP TSG RAN WG1 Meeting #94, 3GPP Draft; R1-1808302 Discussion On Uplink Pre-Emption Indication, 3rd Generation Partnership Project (3GPP), Mobile Competence Centre, 650, Route Des Lucioles; F-06921 Sophia-Antipolis Cedex, France, vol. RAN WG1, No. Gothenburg, Sweden; Aug. 20, 2018—Aug. 24, 2018, Aug. 10, 2018 (Aug. 10, 2018), 5 Pages, XP051515689, Retrieved from the Internet: URL: http://www.3gpp.org/ftpftsg%5Fran/WG1%5FRL1/TSGR1%5F94/Docs/R1 %2D1808302%2Ezip, [retrieved on Aug. 10, 2018], Section 2; figure 1, Section 2.3.
(Continued)

*Primary Examiner* — Anh Ngoc M Nguyen
(74) *Attorney, Agent, or Firm* — Holland & Hart LLP

(57) ABSTRACT

Methods, systems, and devices for wireless communications are described. A user equipment (UE) may receive, from a base station in wireless communication with the UE, an allocation of time and frequency resources for an uplink transmission of a first communication type associated with a threshold reliability or latency metric. The UE may monitor a control channel for an uplink preemption indication from the base station, the uplink preemption indication indicating whether the UE should transmit the uplink transmission using the first communication type associated with the threshold reliability or latency metric. The UE may then
(Continued)

process the uplink transmission based on monitoring the control channel for the uplink preemption indication.

29 Claims, 17 Drawing Sheets

(51) Int. Cl.
*H04W 72/044* (2023.01)
*H04W 72/56* (2023.01)

(56) References Cited

U.S. PATENT DOCUMENTS

| | | | | |
|---|---|---|---|---|
| 2019/0052432 | A1* | 2/2019 | Islam | H04L 5/0005 |
| 2019/0253137 | A1* | 8/2019 | Sun | H04B 7/2643 |
| 2019/0297638 | A1* | 9/2019 | Park | H04W 72/042 |
| 2020/0059835 | A1* | 2/2020 | Kim | H04W 36/0061 |
| 2020/0128570 | A1* | 4/2020 | Wong | H04W 72/0453 |
| 2020/0228230 | A1* | 7/2020 | Mukherjee | H04L 1/1893 |
| 2020/0366429 | A1* | 11/2020 | Huang | H04W 72/085 |

OTHER PUBLICATIONS

Institute for Information Industry (III): "Discussion on Inter UE UL Multiplexing", 3GPP TSG RAN WG1 Meeting #94, 3GPP Draft; R1-1808868, 3rd Generation Partnership Project (3GPP), Mobile Competence Centre, 650, Route Des Lucioles; F-06921 Sophia-Antipolis Cedex, France, vol. Ran WG1, No. Gothenburg, Sweden; Aug. 20, 2018—Aug. 24, 2018, Aug. 10, 2018 (Aug. 10, 2018), 3 Pages, XP051516239, Retrieved from the Internet: URL: http://www.3gpp.org/ftp/tsg%5Fran/WG1%5FRL1/TSGR1%5F94/Docs/R1%2D1808868%2Ezip, [retrieved onAug. 10, 2018], Section 2.
International Search Report and Written Opinion—PCT/US2019/052825 —ISA/EPO—dated Jan. 3, 2020.
Qualcomm Incorporated: "eMBB and URLLC Dynamic Multiplexing and Preemption Indication on the Uplink", 3GPP TSG RAN WG1 #92b, 3GPP Draft; R1-1804820 eMBB and URLLC Dynamic Multiplexing and Preemption Indication on the Uplink, 3RD Generation Partnership Project (3GPP), Mobile Competence Centre ; 650, Route Des Lucioles ; F-06,vol. RAN WG1, No. Sanya, China; Apr. 16, 2018—Apr. 20, 2018, Apr. 15, 2018 (Apr. 15, 2018), XP051427086, 11 Pages, Retrieved from the Internet: URL:http://www.3gpp.org/ftp/Meetings%5F3GPP%5FSYNC/RAN1/Docs/ [retrieved onApr. 15, 2018], Section 5.
Sony: "UL Inter-UE Pre-emption", 3GPP TSG RAN WG1 Meeting #94, 3GPP Draft; R1-1808344—REL-16 URLLC—UL Pre-Emption V04, 3rd Generation Partnership Project (3GPP), Mobile Competence Centre, 650, Route Des Lucioles; F-06921 Sophia-Antipolis Cedex, France, vol. RAN WG1, No. Gothenburg, Sweden; Aug. 20, 2018-Aug. 24, 2018, Aug. 11, 2018 (Aug. 11, 2018), 6 Pages, XP051515726, Retrieved from the Internet: URL: http://www.3gpp.org/ftp/tsg%5Fran/WG1%5FRL1/TSGR1%5F94/Docs/R1%2D1808344%2Ezip, [retrieved on Aug. 11, 2018], Section 2.1, Section 2.2.
Taiwan Search Report—TW108134604—TIPO—dated Jan. 9, 2023.

* cited by examiner

UPLINK PREEMPTION INDICATION

CROSS REFERENCE

The present Application for Patent claims the benefit of U.S. Provisional Patent Application No. 62/736,448 by HOSSEINI et al., entitled "UPLINK PREEMPTION INDICATION," filed Sep. 25, 2018, assigned to the assignee hereof, and which is expressly incorporated by reference herein.

BACKGROUND

The following relates generally to wireless communications, and more specifically to uplink preemption indication.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM).

A wireless multiple-access communications system may include a number of base stations or network access nodes, each simultaneously supporting communication for multiple communication devices, which may be otherwise known as user equipment (UE). Some examples of wireless communications systems may perform wireless communications using various data types and/or priorities. As one example of a high priority communication, certain priority transmissions may include communication of data packets that occur within a shorter timeline and at a higher-reliability factor. One non-limiting example of such priority communications may include ultra-reliable, low latency communications (URLLC).

SUMMARY

The described techniques relate to improved methods, systems, devices, and apparatuses that support uplink preemption indication. Some examples of wireless communications systems may perform wireless communications using various data types and/or priorities. As one example of a high priority communication, certain priority transmissions may include communication of data packets that occur within a shorter timeline and at a higher-reliability factor. One non-limiting example of such priority communications may include ultra-reliable, low latency communications (URLLC). As one example of a lower priority communication, certain transmissions may include communication of data packets that occur using a longer timeline and at a lower-reliability factor. One non-limiting example of such lower priority communications may include machine-type communications (MTC), mobile broadband (MBB) communications, enhanced MBB (eMBB) communications, and the like. To accommodate requirements (e.g., reliability and latency) of both lower and higher priority communications (e.g., eMBB and URLLC), in some cases the higher priority communications may be prioritized over the lower priority communications. For example, some wireless communications systems may support preempting the lower priority communications to support the higher priority communications. As described herein, a base station (e.g., gNB) may transmit a preemption message (e.g., a preemption indication) to inform a user equipment (UE) to preempt low latency communications (e.g., URLLC) to support higher latency communications (e.g., eMBB communications).

A method of wireless communications at a UE is described. The method may include receiving, from a base station in wireless communication with the UE, an allocation of time and frequency resources for an uplink transmission of a first communication type associated with a threshold reliability or latency metric, monitoring, based on receiving the allocation of time and frequency resources for the uplink transmission of the first communication type, a control channel for an uplink preemption indication from the base station, the uplink preemption indication indicating whether the UE should transmit the uplink transmission using the first communication type associated with the threshold reliability or latency metric, and processing the uplink transmission based on monitoring the control channel for the uplink preemption indication.

An apparatus for wireless communications is described. The apparatus may include a processor, memory in electronic communication with the processor, and instructions stored in the memory. The instructions may be executable by the processor to cause the apparatus to receive, from a base station in wireless communication with the apparatus, an allocation of time and frequency resources for an uplink transmission of a first communication type associated with a threshold reliability or latency metric, monitor, based on receiving the allocation of time and frequency resources for the uplink transmission of the first communication type, a control channel for an uplink preemption indication from the base station, the uplink preemption indication indicating whether the apparatus should transmit the uplink transmission using the first communication type associated with the threshold reliability or latency metric, and process the uplink transmission based on monitoring the control channel for the uplink preemption indication.

Another apparatus for wireless communications is described. The apparatus may include means for receiving, from a base station in wireless communication with the apparatus, an allocation of time and frequency resources for an uplink transmission of a first communication type associated with a threshold reliability or latency metric, monitoring, based on receiving the allocation of time and frequency resources for the uplink transmission of the first communication type, a control channel for an uplink preemption indication from the base station, the uplink preemption indication indicating whether the apparatus should transmit the uplink transmission using the first communication type associated with the threshold reliability or latency metric, and processing the uplink transmission based on monitoring the control channel for the uplink preemption indication.

A non-transitory computer-readable medium storing code for wireless communications at a UE is described. The code may include instructions executable by a processor to receive, from a base station in wireless communication with the UE, an allocation of time and frequency resources for an uplink transmission of a first communication type associated with a threshold reliability or latency metric, monitor, based on receiving the allocation of time and frequency resources for the uplink transmission of the first communication type, a control channel for an uplink preemption indication from the base station, the uplink preemption indication indicating whether the UE should transmit the uplink transmission using the first communication type associated with the threshold reliability or latency metric, and process the uplink transmission based on monitoring the control channel for the uplink preemption indication.

Some examples of the method, apparatuses, and non-transitory computer-readable medium described herein may further include operations, features, means, or instructions for receiving the uplink preemption indication based on monitoring the control channel, where processing the uplink transmission may be based on receiving the uplink preemption indication and transmitting the uplink transmission using the time and frequency resources allocated based on receiving the uplink preemption indication on the control channel.

Some examples of the method, apparatuses, and non-transitory computer-readable medium described herein may further include operations, features, means, or instructions for determining an absence of the uplink preemption indication on the control channel based on the monitoring, where processing the uplink transmission may be based on determining the absence of the uplink preemption indication on the control channel.

Some examples of the method, apparatuses, and non-transitory computer-readable medium described herein may further include operations, features, means, or instructions for adjusting a transmit power associated with the uplink transmission based on determining the absence of the uplink preemption indication on the control channel, where processing the uplink transmission may be based on adjusting the transmit power and transmitting the uplink transmission according to the adjusted transmit power.

In some examples of the method, apparatuses, and non-transitory computer-readable medium described herein, the transmit power is signaled to the UE via radio resource control (RRC) signaling.

Some examples of the method, apparatuses, and non-transitory computer-readable medium described herein may further include operations, features, means, or instructions for adjusting a number of uplink transmission repetitions associated with the uplink transmission based on determining the absence of the uplink preemption indication on the control channel, where processing the uplink transmission may be based on adjusting the number of uplink transmission repetitions and transmitting the uplink transmission according to the adjusted number of uplink transmission repetitions.

Some examples of the method, apparatuses, and non-transitory computer-readable medium described herein may further include operations, features, means, or instructions for identifying a number of uplink transmission repetitions associated with the uplink transmission and refraining from transmitting the number of uplink transmission repetitions associated with the uplink transmission over the time and frequency resources for the uplink transmission until the uplink preemption indication on the control channel is received, where processing the uplink transmission includes refraining from transmitting the number of uplink transmission repetitions associated with the uplink transmission over the time and frequency resources for the uplink transmission until the uplink preemption indication on the control channel is received.

Some examples of the method, apparatuses, and non-transitory computer-readable medium described herein may further include operations, features, means, or instructions for configuring a port for the uplink transmission via RRC, where processing the uplink transmission includes transmitting the uplink transmission using the configured port.

Some examples of the method, apparatuses, and non-transitory computer-readable medium described herein may further include operations, features, means, or instructions for identifying a transmission precoding matrix indication (TPMI) for the uplink transmission, where processing the uplink transmission includes transmitting the uplink transmission according to the TPMI.

Some examples of the method, apparatuses, and non-transitory computer-readable medium described herein may further include operations, features, means, or instructions for refraining from transmitting the uplink transmission based on determining the absence of the uplink preemption indication on the control channel, where processing the uplink transmission includes refraining transmission of the uplink transmission.

In some examples of the method, apparatuses, and non-transitory computer-readable medium described herein, receiving the allocation of time and frequency resources for the uplink transmission of the first communication type may include operations, features, means, or instructions for receiving a grant including the allocation of time and frequency resources for the uplink transmission of the first communication type associated with the threshold reliability or latency metric.

In some examples of the method, apparatuses, and non-transitory computer-readable medium described herein, the control channel for monitoring the uplink preemption indication by the UE is different than a second control channel for monitoring a second uplink preemption indication by the second UE of the second communication type.

In some examples of the method, apparatuses, and non-transitory computer-readable medium described herein, the control channel for monitoring the uplink preemption indication by the UE is a same control channel for monitoring a second uplink preemption indication by the second UE of the second communication type.

In some examples of the method, apparatuses, and non-transitory computer-readable medium described herein, the first communication type includes URLLC, and the second communication type includes at least one of MTC, MBB communications, or eMBB communications.

In some examples of the method, apparatuses, and non-transitory computer-readable medium described herein, the uplink preemption indication further indicating whether an uplink transmission of a second communication type of a second UE is preempted by the uplink transmission of the first communication type of the UE.

A method of wireless communications is described. The method may include receiving, from a first UE in wireless communication with the base station, an uplink transmission of a first communication type associated with a threshold reliability or latency metric, determining that the uplink transmission satisfies a threshold of uplink transmission repetitions, and transmitting, to a second UE that is in wireless communication of a second communication type with the base station, an uplink preemption indication indicating whether the UE should transmit the uplink transmission using the first communication type associated with the threshold reliability or latency metric based on the determining.

An apparatus for wireless communications is described. The apparatus may include a processor, memory in electronic communication with the processor, and instructions stored in the memory. The instructions may be executable by the processor to cause the apparatus to receive, from a first UE in wireless communication with the apparatus, an uplink transmission of a first communication type associated with a threshold reliability or latency metric, determine that the uplink transmission satisfies a threshold of uplink transmission repetitions, and transmit, to a second UE that is in wireless communication of a second communication type with the apparatus, an uplink preemption indication indicating whether the UE should transmit the uplink transmission using the first communication type associated with the threshold reliability or latency metric based on the determining.

Another apparatus for wireless communications is described. The apparatus may include means for receiving, from a first UE in wireless communication with the apparatus, an uplink transmission of a first communication type associated with a threshold reliability or latency metric, determining that the uplink transmission satisfies a threshold of uplink transmission repetitions, and transmitting, to a second UE that is in wireless communication of a second communication type with the apparatus, an uplink preemption indication indicating whether the UE should transmit the uplink transmission using the first communication type associated with the threshold reliability or latency metric based on the determining.

A non-transitory computer-readable medium storing code for wireless communications is described. The code may include instructions executable by a processor to receive, from a first UE in wireless communication with the base station, an uplink transmission of a first communication type associated with a threshold reliability or latency metric, determine that the uplink transmission satisfies a threshold of uplink transmission repetitions, and transmit, to a second UE that is in wireless communication of a second communication type with the base station, an uplink preemption indication indicating whether the UE should transmit the uplink transmission using the first communication type associated with the threshold reliability or latency metric based on the determining.

Some examples of the method, apparatuses, and non-transitory computer-readable medium described herein may further include operations, features, means, or instructions for configuring time and frequency resources of the uplink transmission of the first communication type for the first UE, the uplink transmission including a number of uplink transmission repetitions and transmitting, to the first UE, a control message including an indication of the configured time and frequency resources of the uplink transmission of the first communication type, where receiving the uplink transmission of the first communication type may be based on the configured time and frequency resources.

Some examples of the method, apparatuses, and non-transitory computer-readable medium described herein may further include operations, features, means, or instructions for determining that the uplink transmission may be associated with the configured time and frequency resources based on the uplink transmission of the number of uplink transmission repetitions satisfying the threshold of uplink transmission repetitions, where determining that the uplink transmission satisfies the threshold of uplink transmission repetitions may be further based on determining that the uplink transmission may be associated with the configured time and frequency resources.

Some examples of the method, apparatuses, and non-transitory computer-readable medium described herein may further include operations, features, means, or instructions for identifying time and frequency resources in which the second UE may be to refrain from transmitting the uplink transmission of the second communication type, where the uplink preemption indication indicates the time and frequency resources in which the second UE may be to refrain from transmitting.

In some examples of the method, apparatuses, and non-transitory computer-readable medium described herein, the threshold of uplink transmission repetitions includes at least one uplink transmission.

In some examples of the method, apparatuses, and non-transitory computer-readable medium described herein, the uplink preemption indication includes an RRC message.

In some examples of the method, apparatuses, and non-transitory computer-readable medium described herein, the uplink preemption indication includes a downlink control information (DCI) message.

In some examples of the method, apparatuses, and non-transitory computer-readable medium described herein, the first communication type includes URLLC.

In some examples of the method, apparatuses, and non-transitory computer-readable medium described herein, the second communication type includes MTC, MBB communications, or eMBB communications.

DETAILED DESCRIPTION

Figure 1:
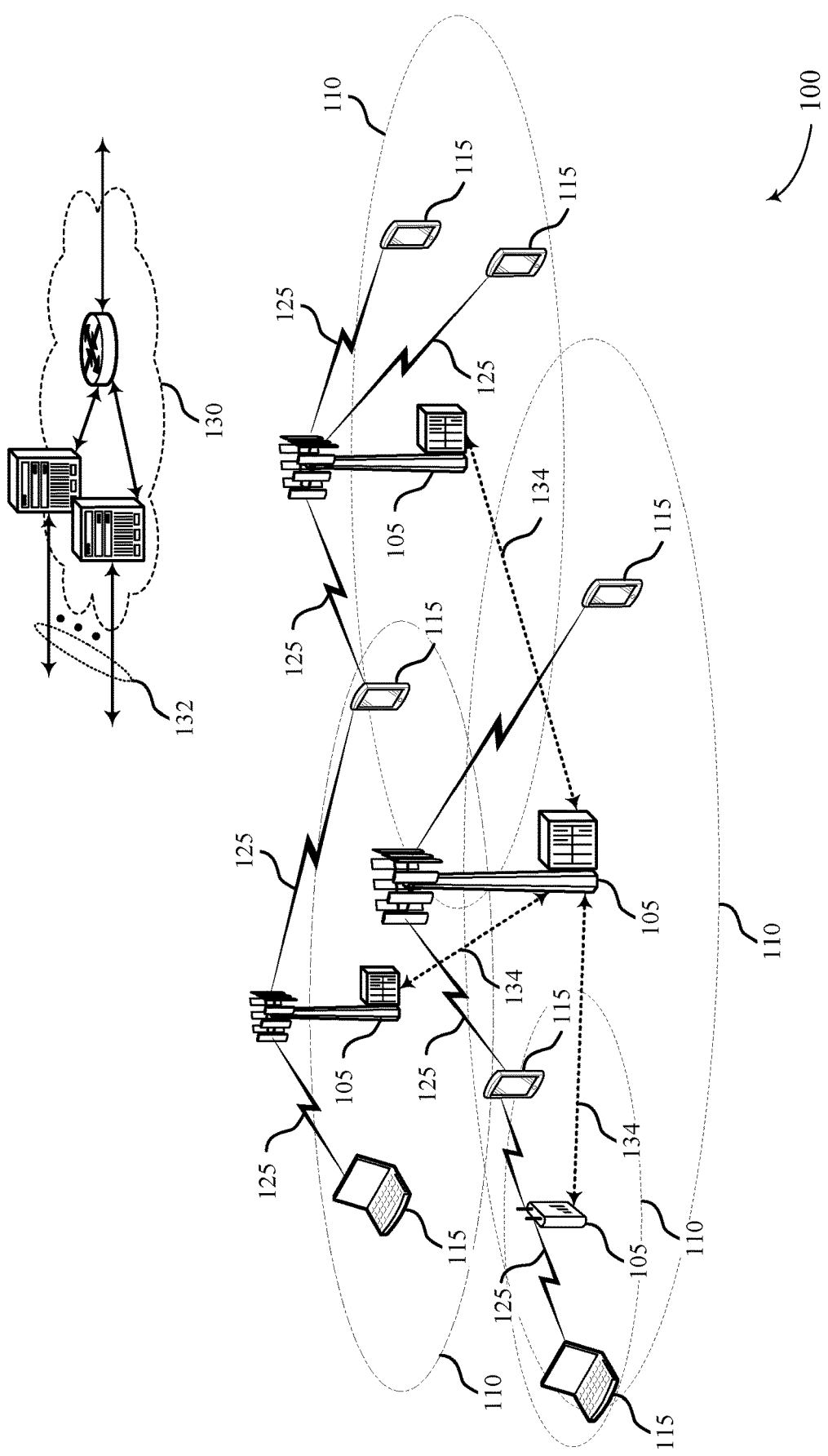
FIGS. 1 and 2 illustrate examples of wireless communications systems that support uplink preemption indication in accordance with aspects of the present disclosure.

A base station may be in wireless communications with one or more user equipments (UEs), which may communicate with the base station according to low latency communications (e.g., ultra-reliable, low latency communications (URLLC)) or higher latency communications (e.g., enhanced mobile broadband (eMBB) communications). The base station may allocate resources such as, time and frequency resources for the one or more UEs according to the communication type of each UE (e.g., low latency communications, high latency communications). For example, the base station may transmit an allocation of resources to each of the UEs in a grant (e.g., downlink control information (DCI)) on a control channel. Allocation of resources may be given higher priority to low latency communications compared to high latency communications.

In some cases, because the low latency communications have a higher priority, it may require faster signaling (e.g., quicker N2 signaling for uplink scheduling) compared to the high latency communications that have a lower priority. In this case, some resources allocated for the high latency communications (e.g., eMBB traffic) may be reallocated for the low latency communications (e.g., URLLC traffic). The reallocation of resources of the high latency communications traffic may cause interference to the low latency communications traffic. To reduce the interference, UEs related to the high latency communications traffic may be requested to preempt their uplink transmission. This may be performed by transmitting an uplink preemption indication to these UEs.

While the interference imposed by the high latency communications UEs is mitigated, the low latency communications UEs may still experience latency with decoding the control channel carrying the grant. To decrease this latency and dependence on, for example, the physical downlink control channel (PDCCH) decoding, the grant-free uplink may be configured for the low latency communications. In some cases, the uplink resources for the high latency communications may overlap with configured resources of the low latency communications. Alternatively, the resources may be non-overlapping. In this case, there may be no need for monitoring for the uplink preemption indication for the grant-based high latency communications and grant-free low latency communications multiplexing. As such, the base station may be unaware of whether the low latency communications resources are going to be used by the UE. So, if the base station transmits an uplink preemption indication preemptively, the high latency communications UEs may experience interruptions on uplink transmissions. As a result, some techniques may be insufficient for multiplexing of high latency communications and grant-free low latency communications resources in the uplink.

The improved techniques described herein may support efficient multiplexing of high latency communications and grant-free low latency communications resources in the uplink. According to an example technique, when a low latency communications UE (e.g., URLLC UE) is using configured resources with repetition, after a certain number of repetitions, the base station may determine that the UE is using the configured resources. For example, after a first repetition of the configured resources, the base station may determine that the UE is using the configured resources. In response to the determination, the base station may transmit an uplink preemption indication to terminate the high latency communications transmission and to reallocate the remaining configured resources. As a result, the base station may refrain from transmitting the uplink preemption preemptively.

According to another example technique, the low latency communications UE (e.g., that is configured with uplink resources) may also monitor for the uplink preemption indication. This may be the same uplink preemption indication being monitored by the high latency communications UE (e.g., eMBB UE), or may be on separate resources (e.g., channel, frequency and time resources). In some cases, prior to the uplink transmission by the low latency communications UE using the configured grant, if the uplink preemption indication (e.g., intended for the same configured resources) is detected, the UE may follow its uplink configuration. If the low latency communications UE does not detect the uplink preemption indication, however, it may transmit its uplink transmissions with a power boost (e.g., an amount of power boost indicated by radio resource control (RRC) signaling) or the number of repetitions of the uplink transmission may be increased by a given factor. In some cases, a different port compared to a previous configured port for the UE may be used. This alternative port may also be configured via RRC for the UE. In some cases, a different transmitted precoding matrix indicator (TPMI) may be used by the UE (also, the alternative TPMI may be configured). Additionally, or alternatively, if the low latency communications UE does not detect the uplink preemption indication, the UE may abandon (e.g., ignore) the uplink transmission, which results in increased latency for the low latency communications uplink transmission. If repetitions are configured, the UE may attempt the uplink opportunities until the uplink preemption indication is detected or skipped.

Particular aspects of the subject matter described in this disclosure may be implemented to realize one or more of the following potential advantages. The techniques employed by the base station and/or the UE may provide benefits and enhancements to the operation of the base station and/or the UE. For example, operations performed by the base station and/or the UE may provide improvements to wireless operations. In some examples, the base station and/or the UE may support high reliability and low latency communications, among other examples, in accordance with one or more uplink preemption indications. The described techniques may thus include features for improvements to power consumption, spectral efficiency, higher data rates and, in some examples, may promote enhanced efficiency for high reliability and low latency operations, among other benefits.

Aspects of the disclosure are initially described in the context of a wireless communications system. Aspects of the disclosure are further described in the context of process flows. Aspects of the disclosure are further illustrated by and described with reference to apparatus diagrams, system diagrams, and flowcharts that relate to an uplink preemption indication.

FIG. 1 illustrates an example of a wireless communications system 100 that supports uplink preemption indication in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), eMBB, or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna sub-arrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency-division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A base station 105 and UE 115 in the wireless communications system 100 may support preempting a lower priority communication to support a higher priority communication. For example, a base station 105 may transmit a preemption message (e.g., a preemption indication) to inform a UE 115 to preempt low latency communications (e.g., URLLC) to support higher latency communications (e.g., eMBB). For example, when a base station 105 determines that low latency communications is to be given priority over high latency communications, the base station 105 may inform affected UEs 115 (e.g., UEs associated with high latency communications such as, eMBB) of the low latency communications.

Figure 2:
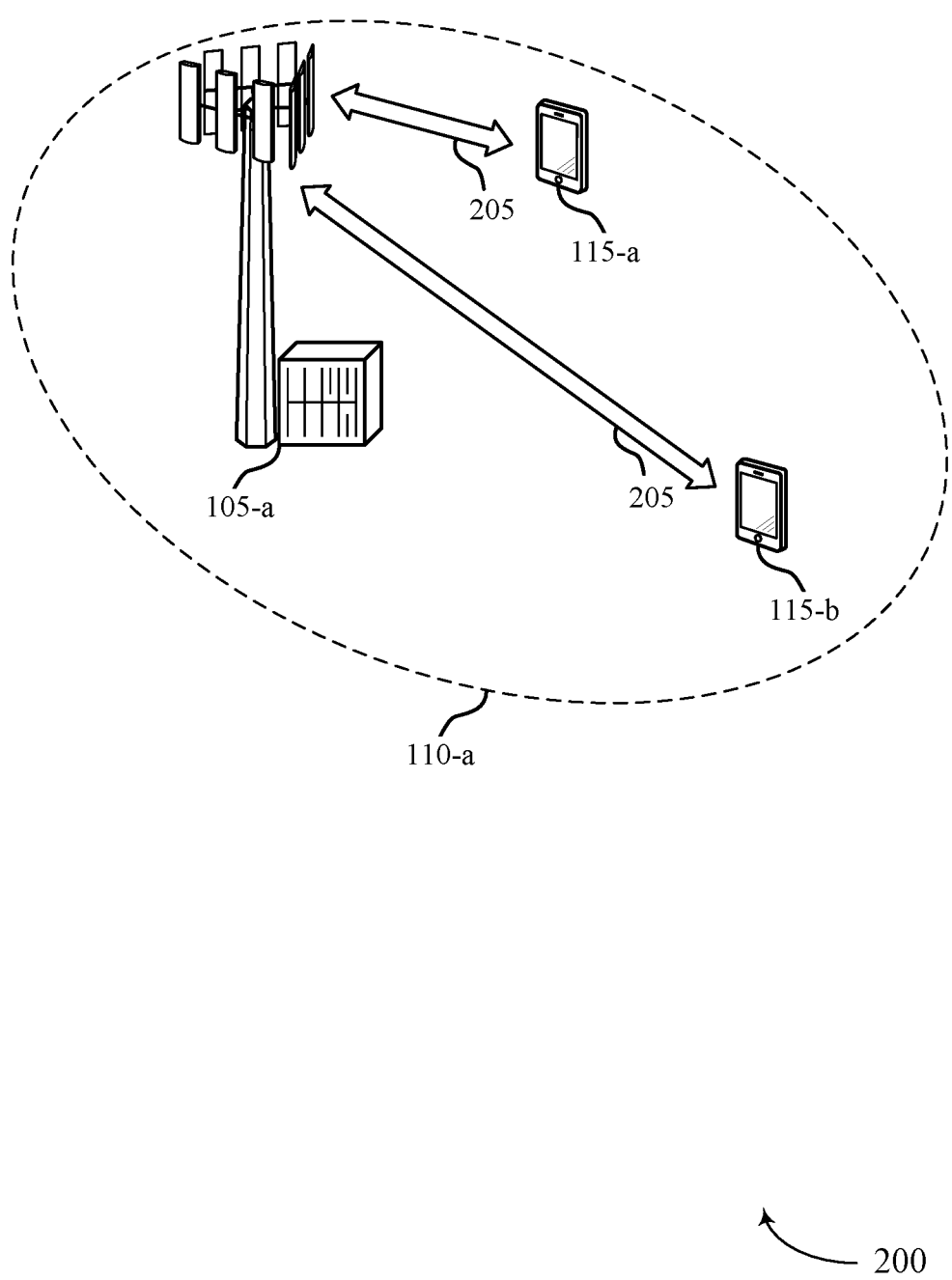

FIG. 2 illustrates an example of a wireless communications system 200 that supports uplink preemption indication in accordance with aspects of the present disclosure. The wireless communications system 200 may include a base station 105-a, a UE 115-a, and a UE 115-b, which may be examples of the corresponding devices described with reference to FIG. 1. The wireless communications system 200 may also implement aspects of the wireless communications system 100. For example, the base station 105-a may support providing an uplink preemption indication to the UE 115-a or the UE 115-b, or both, and the UE 115-a and UE 115-b may support low latency communications (e.g., URLLC) or high latency communications (e.g., eMBB), or both. Additionally, the wireless communications system 200 may support efficient techniques for facilitating uplink preemption indication for eMBB and URLLC multiplexing with configured resources. The base station 105-a may communicate with the UE 115-a and the UE 115-b within a coverage area 110-a.

The base station 105-a may perform a communication procedure (e.g., an RRC procedure, such as a cell acquisition procedure, random access procedure, RRC connection procedure, RRC configuration procedure) with the UE 115-a or the UE 115-b, or both. The base station 105-a may be configured with multiple antennas, which may be used for directional or beamformed transmissions. As part of the communication procedure, the base station 105-a may establish a bi-directional communication link 205 (e.g., an RRC connection) for communication with the UE 115-a and the UE 115-b. Additionally, or alternatively, as part of the communication procedure, the base station 105-a may allocate resources (e.g., time and frequency resources) to each of the UE 115-a and the UE 115-b.

In the example of FIG. 2, the UE 115-a may support low latency communications such as URLLC, and the UE 115-b may support high latency communications such as eMBB. The base station 105-a may configure the UE 115-a or UE 115-b, or both to monitor for an uplink preemption indication for an uplink transmission (or a set of uplink transmissions). In particular, the base station 105-a may transmit an indication in a grant to the UE 115-a or the UE 115-b, or both that indicates whether UE 115-a and/or the UE 115-b is to monitor for an uplink preemption indication for an uplink transmission scheduled by the grant. For example, the indication may include at least a one-bit field, where a bit value of one may indicate that the UE 115-a and/or the UE 115-b is to monitor for an uplink preemption indication (e.g., when the scheduled uplink transmission is likely to be preempted), and a bit value of zero may indicate that UE 115-a and/or the UE 115-b is to avoid monitoring for an uplink preemption indication (e.g., when the scheduled uplink transmission is unlikely to be preempted).

In some cases, the base station 105-a may determine whether to configure the UE 115-a and/or the UE 115-b to monitor for an uplink preemption indication for an uplink transmission based on one or more factors. In one example, the base station 105-a may determine whether to configure UE 115-a and/or the UE 115-b to monitor for an uplink preemption indication for an uplink transmission based on traffic conditions or channel conditions. In this example, if traffic conditions or channel conditions (e.g., reliability of the channel) indicate a high likelihood that a low latency transmission is to be scheduled on resources allocated to the UE 115-a and/or the UE 115-b for the uplink transmission, the base station 105-a may configure the UE 115-a and/or the UE 115-b to monitor for an uplink preemption indication for an uplink transmission. Alternatively, if traffic conditions or channel conditions indicate a low likelihood that a low latency transmission is to be scheduled on resources allocated to the UE 115-a and/or the UE 115-b for the uplink transmission, the base station 105-a may configure the UE 115-a and/or the UE 115-b to avoid monitoring for an uplink preemption indication for an uplink transmission.

The base station 105-a may additionally, or alternatively determine whether to configure the UE 115-a and/or the UE 115-b to monitor for an uplink preemption indication for an uplink transmission based on a priority associated with the uplink transmission. In this example, if the uplink transmission is a low priority transmission (e.g., an eMBB transmission), the base station 105-a may configure the UE 115-a and/or the UE 115-b to monitor for an uplink preemption indication for the uplink transmission. Alternatively, if the uplink transmission is a high priority transmission (e.g., a low latency transmission), the base station 105-a may configure the UE 115-a and/or the UE 115-b to avoid monitoring for an uplink preemption indication for the uplink transmission.

In some cases, the base station 105-a may transmit the indication in a first downlink control channel (e.g., carrying a first DCI message), and the indication may configure the UE 115-a and/or the UE 115-b to monitor or avoid monitoring a second downlink control channel (e.g., potentially carrying a second DCI message) for an uplink preemption indication for an uplink transmission. In some cases, the UE 115-a and/or the UE 115-b may be configured via RRC signaling to monitor for the indication. In other cases, if the UE 115-a and/or the UE 115-b is incapable of monitoring for the indication, the UE 115-a and/or the UE 115-b may avoid monitoring for the indication. In such cases, the base station 105-a may configure the UE 115-a and/or the UE 115-b via RRC signaling to monitor or avoid monitoring for uplink preemption indications for uplink transmissions.

In some cases, when the UE 115-a (e.g., URLLC UE) is using configured resources with repetition, after a certain number of repetitions, the base station 105-a may determine that the UE 115-a is transmitting on the configured resources. That is, the base station 105-a knows which resources are configured, but does not know if they are going to be used for uplink transmission. For instance, when there is no data, the UE 115-a may not transmit anything. In some examples, after a first repetition of the configured resources, the base station 105-a may determine that the UE 115-a is using the configured resources. In response to the determination, the base station 105-a may transmit an uplink preemption indication to terminate the high latency communications transmission and to reallocate the remaining configured resources. As a result, the base station 105-a may refrain from transmitting the uplink preemption preemptively.

The UE 115-a (e.g., that is configured with uplink resources) may also monitor for the uplink preemption indication. This may be the same uplink preemption indication being monitored by the UE 115-b (e.g., eMBB UE), or may be on separate resources (e.g., channel, frequency and time resources). In some cases, prior to the uplink transmission by the UE 115-a using the configured grant, if the uplink preemption indication (e.g., intended for the same configured resources) is detected, the UE 115-a may follow its uplink configuration. If the UE 115-a does not detect the uplink preemption indication, however, it may transmit its uplink transmissions with a power boost (e.g., an amount of power boost indicated by RRC signaling) or the number of repetitions of the uplink transmission may be increased by a given factor. In some cases, a different port compared to a previous configured port for the UE may be used for the uplink transmission. This alternative port may also be configured via RRC for the UE. In some cases, a different transmitted precoding matrix indicator (TPMI) may be used by the UE for the uplink transmission (also, the alternative TPMI may be configured). Additionally, or alternatively, if the UE 115-a does not detect the uplink preemption indication, the UE 115-a may abandon (e.g., ignore) the uplink transmission, which results in increased latency for the low latency communications uplink transmission. If repetitions are configured, the UE 115-a may attempt the uplink opportunities until the uplink preemption indication is detected or skipped.

Figure 3:
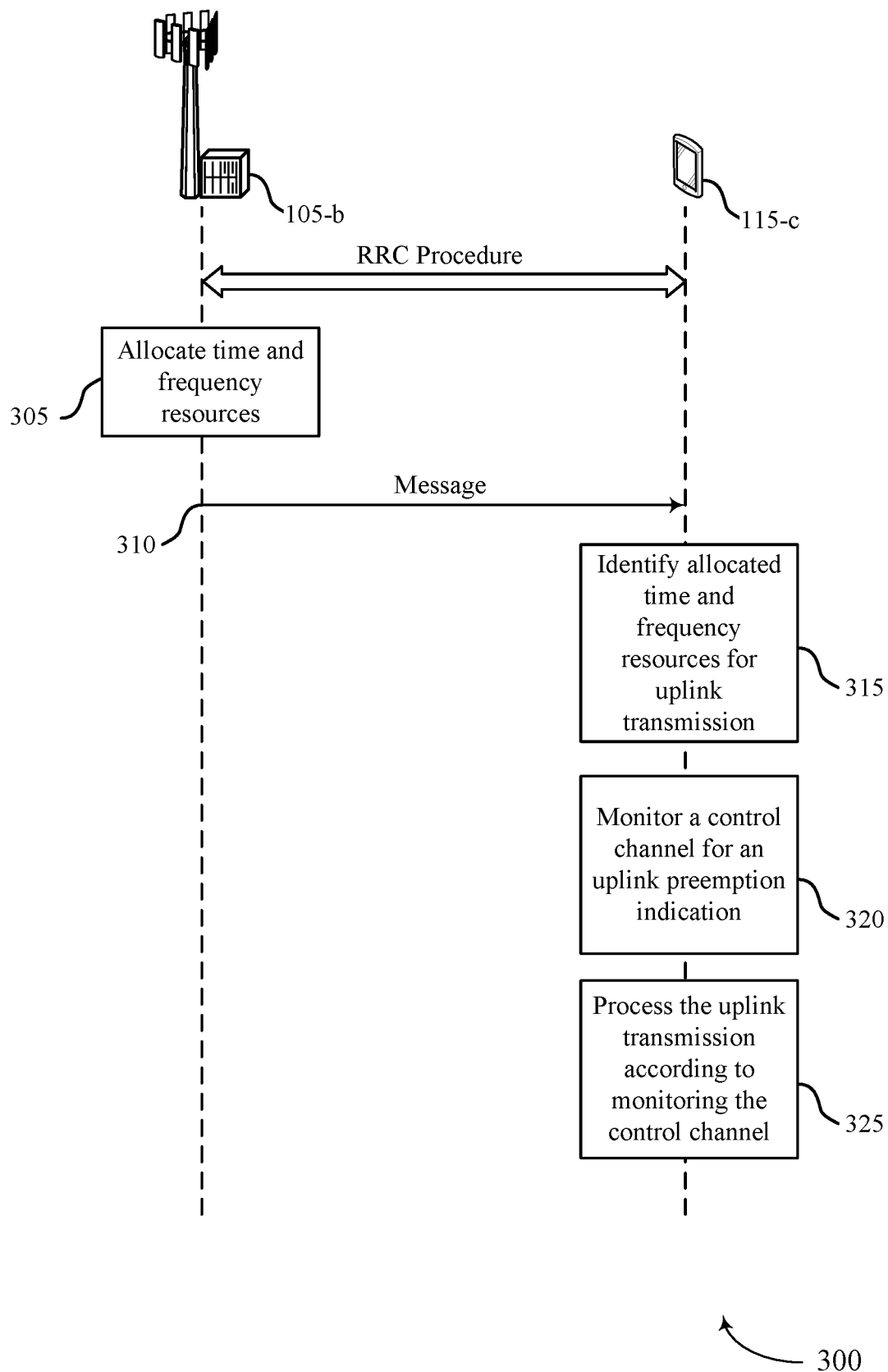
FIGS. 3 and 4 illustrate examples of process flows that support uplink preemption indication in accordance with aspects of the present disclosure.

FIG. 3 illustrates an example of a process flow 300 that supports uplink preemption indication in accordance with aspects of the present disclosure. The process flow 300 may include a base station 105-b and a UE 115-c, which may be examples of the corresponding devices described with reference to FIGS. 1 and 2. In some examples, the process flow 300 may implement aspects of the wireless communications system 100 and 200. For example, the base station 105-b or the UE 115-c, or both may support preempting a higher latency communication to support a lower latency communication. In the following description of the process flow 300, the operations between the base station 105-b and the UE 115-c may be transmitted in a different order than the exemplary order shown, or the operations performed by the base station 105-b and the UE 115-c may be performed in different orders or at different times. Certain operations may also be left out of the process flow 300, or other operations may be added to the process flow 300.

In some examples, the process flow 300 may commence with the base station 105-b establishing a connection with the UE 115-c (e.g., performing a cell acquisition procedure, a random access procedure, an RRC connection procedure, an RRC configuration procedure). At 305, the base station 105-b may allocate time and frequency resources for the UE 115-c. For example, the base station 105-b may allocate time and frequency resources (e.g., physical resource blocks (PRBs)) for downlink and uplink communications to and from the UE 115-c. At 310, the base station 105-b may transmit a message (e.g., grant, DCI message) to the UE 115-c. For example, the base station 105-b may transmit a control message on a downlink control channel (e.g., PDCCH). The control message may include an indication of the time and frequency resources allocated to the UE 115-c. For example, the control message may include an allocation of time and frequency resources for an uplink transmission of a first communication type (e.g., URLLC) associated with a threshold reliability or latency metric.

At 315, the UE 115-c may identify the allocated time and frequency resources, for example, for the uplink transmission. At 320, the UE 115-c may monitor a control channel for an uplink preemption indication. For example, the control message may include information for the UE 115-c to monitor a control channel for receiving the uplink preemption indication. The uplink preemption indication may indicate whether an uplink transmission of a second communication type of a second UE (not shown) is preempted by the uplink transmission of the first communication type of the UE 115-c. In some cases, the control channel for monitoring the uplink preemption indication may be different from a second control channel for monitoring a second uplink preemption indication by another UE (not shown) that may be associated a second communication type (e.g., eMBB). Alternatively, the control channel for monitoring the uplink preemption indication by the UE 115-c may be a same control channel for monitoring an uplink preemption indication by the other UE (not shown) that may be associated a second communication type (e.g., eMBB).

At 325, the UE 115-c may process the uplink transmission according to monitoring the control channel. For example, the UE 115-c may determine whether to transmit the uplink transmission to the base station 105-b. In some cases, the UE 115-c may transmit the uplink transmission using the time and frequency resources allocated based on receiving the uplink preemption indication on the control channel. In some cases, the UE 115-c may determine an absence of the uplink preemption indication on the control channel. For example, the UE 115-c may not detect uplink preemption indication on the control channel based on decoding the control channel. The UE 115-c may in some cases refrain from transmitting the uplink transmission based on determining the absence of the uplink preemption indication on the control channel.

In some examples, the UE 115-c may adjust one or more characteristics (e.g., UE behavior). For example, the UE 115-c may in some cases, adjust a transmit power associated with the uplink transmission based on determining the absence of the uplink preemption indication on the control channel, and transmit the uplink transmission according to the adjusted transmit power. In some examples, the transmit power may be signaled to the UE 115-c via RRC signaling, UE-specific signaling, etc.

The UE 115-c may in some cases adjust a number of uplink transmission repetitions associated with the uplink transmission based on determining the absence of the uplink preemption indication on the control channel, and transmit the uplink transmission according to the adjusted number of uplink transmission repetitions. In some cases, the UE 115-c may identify a number of uplink transmission repetitions associated with the uplink transmission, and skip the number of uplink transmission repetitions associated with the uplink transmission until the UE 115-c receives the uplink preemption indication on the control channel. In some cases, the UE 115-c may refrain from transmitting the number of uplink transmission repetitions associated with the uplink transmission over the time and frequency resources associated with the uplink preemption indication. That is, a URLLC UE may avoid transmission over the resources/symbols for which no uplink preemption indication is received.

Figure 4:
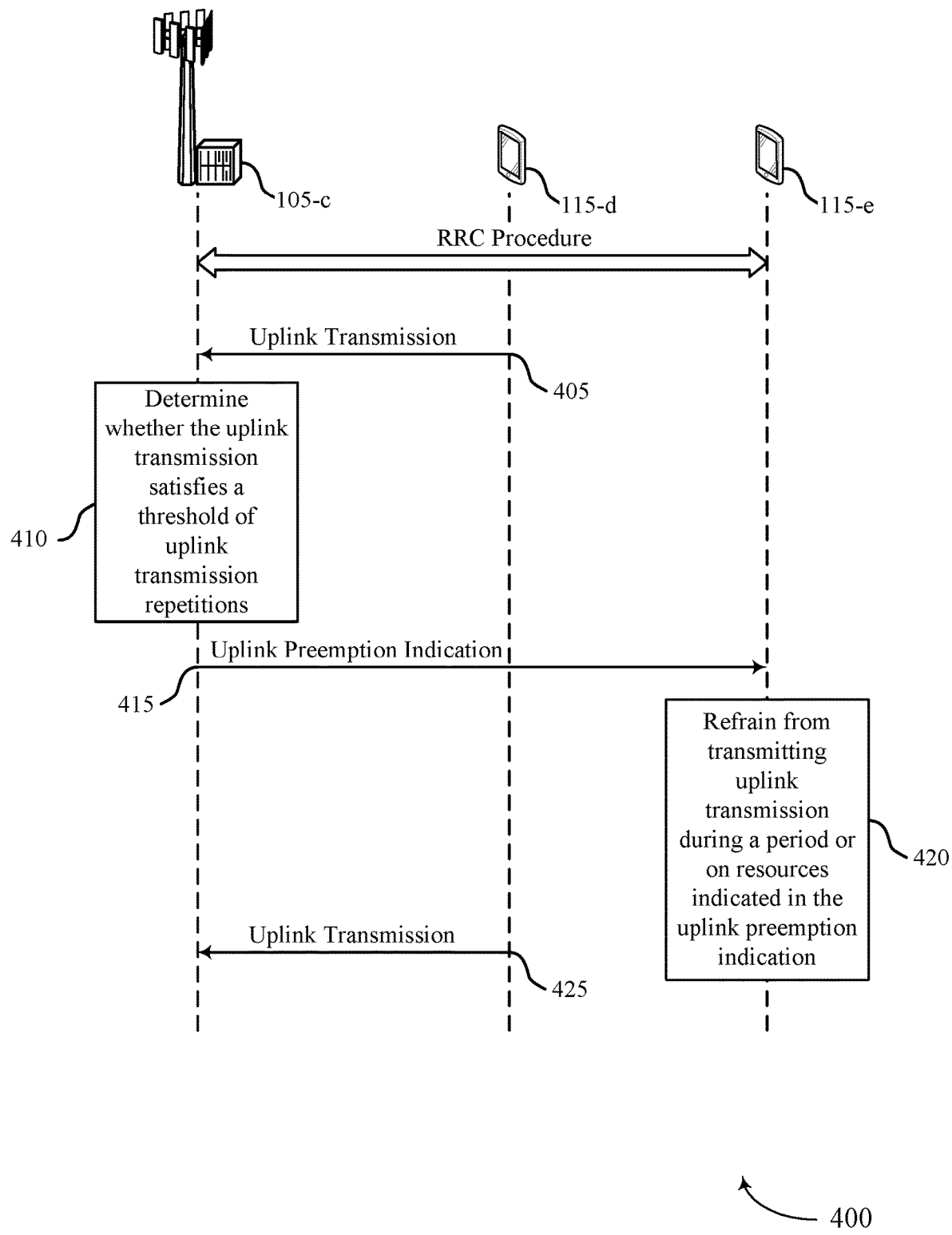

FIG. 4 illustrates an example of a process flow 400 that supports uplink preemption indication in accordance with aspects of the present disclosure. The process flow 400 may include a base station 105-b, a UE 115-d, and a UE 115-e, which may be examples of the corresponding devices described with reference to FIGS. 1 and 2. In some examples, the process flow 400 may implement aspects of the wireless communications system 100 and 200. For example, the base station 105-b, the UE 115-d, or the UE 115-e, or a combination thereof may support preempting a higher latency communication to support a lower latency communication. In the following description of the process flow 400, the operations between the base station 105-c, the UE 115-d, and the UE 115-e may be transmitted in a different order than the exemplary order shown, or the operations performed by the base station 105-c, the UE 115-d, and the UE 115-e may be performed in different orders or at different times. Certain operations may also be left out of the process flow 400, or other operations may be added to the process flow 400.

In some examples, the process flow 400 may commence with the base station 105-c establishing a connection with the UE 115-d and the UE 115-e (e.g., performing a cell acquisition procedure, a random access procedure, an RRC connection procedure, an RRC configuration procedure). At 405, the UE 115-d may transmit an uplink transmission to the base station 105-c. In some examples, the uplink transmission may be of a first communication type associated with a threshold reliability or latency metric. For example, the uplink transmission may be associated with URLLC. In some cases, the uplink transmission may be associated with a number of uplink transmission repetitions.

At 410, the base station 105-c may determine whether the uplink transmission satisfies a threshold of uplink transmission repetitions. If the base station 105-c determines that the uplink transmission satisfies the threshold of uplink transmission repetitions, the base station 105-c may generate an uplink preemption indication (e.g., uplink preemption message). In some examples, the base station 105-c may configure time and frequency resources for uplink transmissions for the UE 115-d. In this case, the base station 105-c may determine that the received uplink transmission from the UE 115-d is associated with the configured time and frequency resources. In some cases, as part of the uplink preemption indication, the base station 105-c may identify time and frequency resources in which the UE 115-e is to refrain from transmitting uplink transmissions.

At 415, the base station 105-c may transmit the uplink preemption indication to the UE 115-e. In this case, the uplink preemption indication is transmitted to the eMBB UE, and commands the eMBB UE to stop transmission over the resources that are being used by URLLC UE. The uplink preemption indication may indicate whether an uplink transmission of the UE 115-e is preempted by the uplink transmission of the UE 115-d. For example, the UE 115-e may be associated with high latency communications such as, eMBB. At 420, the UE 115-e may refrain from transmitting uplink transmission during a period or on resources indicated in the uplink preemption indication. At 425, the UE 115-d may transmit an uplink transmission to the base station 105-c, for example, without interference from the UE 115-e.

Figure 5:
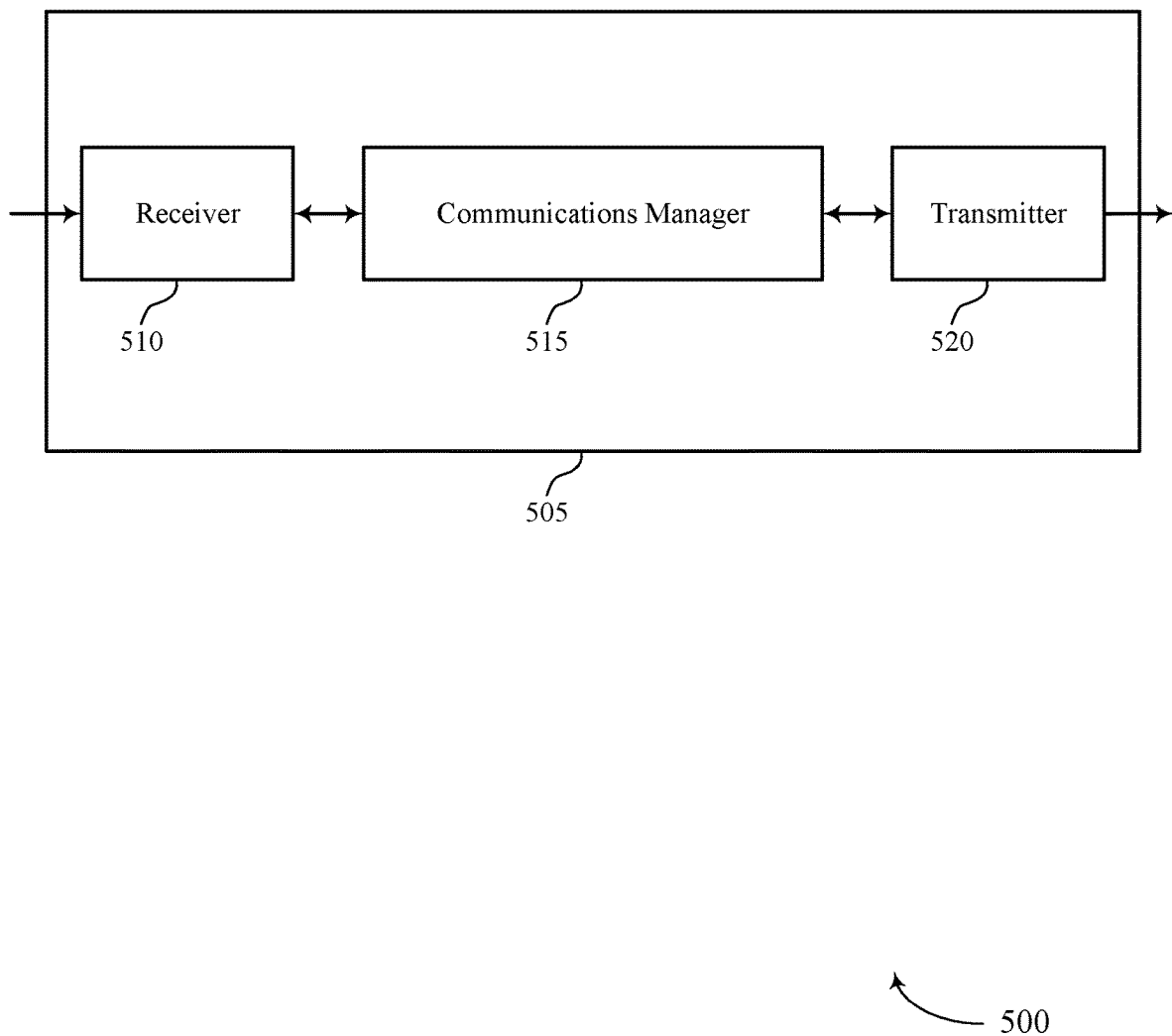
FIGS. 5 and 6 show block diagrams of devices that support uplink preemption indication in accordance with aspects of the present disclosure.

FIG. 5 shows a block diagram 500 of a device 505 that supports uplink preemption indication in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to uplink preemption indication, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, from a base station in wireless communication with the device 505, an allocation of time and frequency resources for an uplink transmission of a first communication type associated with a threshold reliability or latency metric, monitor, based on receiving the allocation of time and frequency resources for the uplink transmission of the first communication type, a control channel for an uplink preemption indication from the base station, the uplink preemption indication indicating whether the device 505 should transmit the uplink transmission using the first communication type associated with the threshold reliability or latency metric or whether an uplink transmission of a second communication type of a second device (e.g., a second UE) is preempted by the uplink transmission of the first communication type of the device 505, and process the uplink transmission based on monitoring the control channel for the uplink preemption indication.

The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
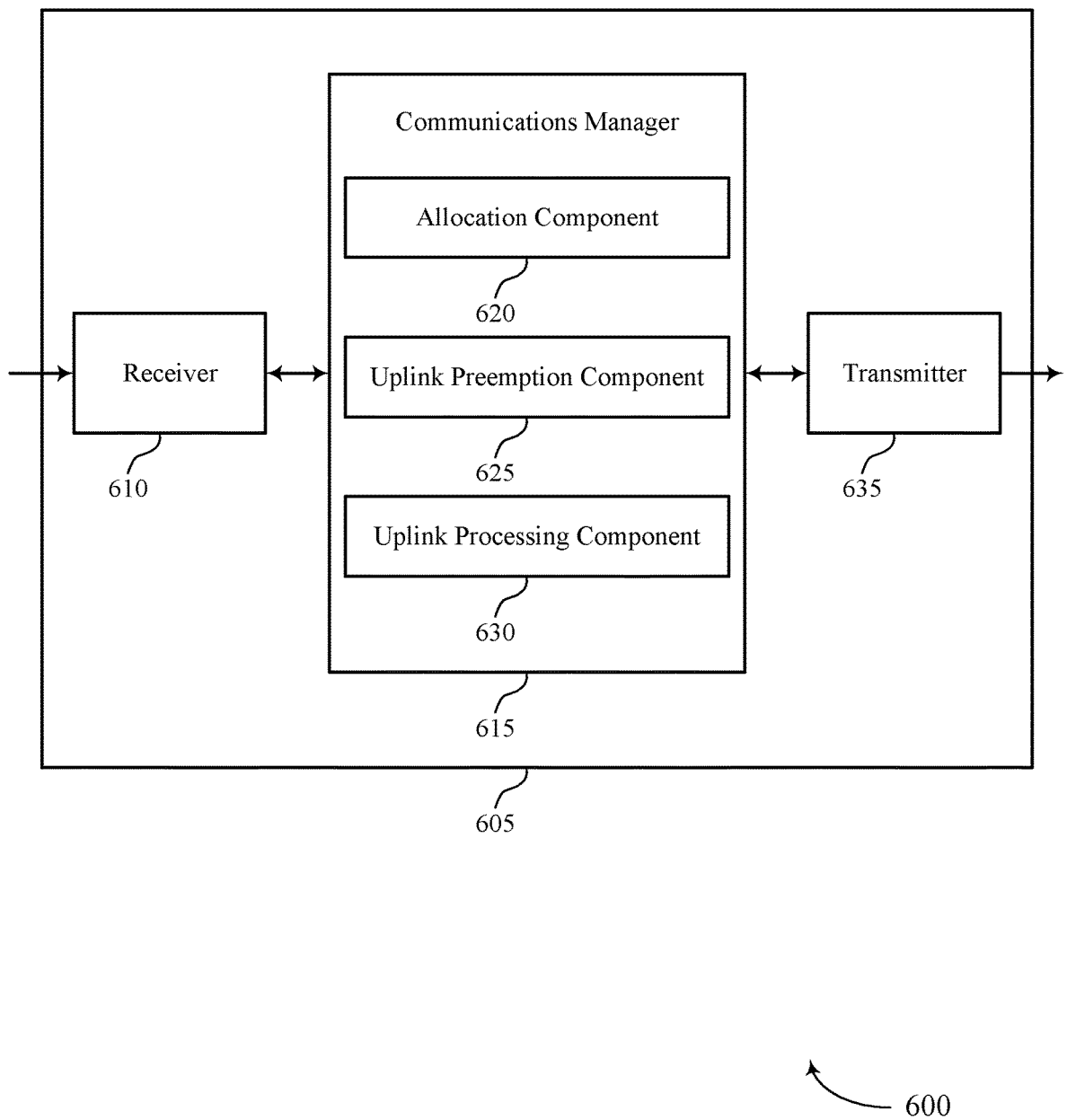

FIG. 6 shows a block diagram 600 of a device 605 that supports uplink preemption indication in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to uplink preemption indication, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include an allocation component 620, an uplink preemption component 625, and an uplink processing component 630. The communications manager 615 may be an example of aspects of the communications manager 810 described herein.

The allocation component 620 may receive, from a base station in wireless communication with the device 605, an allocation of time and frequency resources for an uplink transmission of a first communication type associated with a threshold reliability or latency metric. The uplink preemption component 625 may monitor, based on receiving the allocation of time and frequency resources for the uplink transmission of the first communication type, a control channel for an uplink preemption indication from the base station, the uplink preemption indication indicating whether the device 605 should transmit the uplink transmission using the first communication type associated with the threshold reliability or latency metric or whether an uplink transmission of a second communication type of a second device (e.g., a second UE) is preempted by the uplink transmission of the first communication type of the device 605. The uplink processing component 630 may process the uplink transmission based on monitoring the control channel for the uplink preemption indication.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
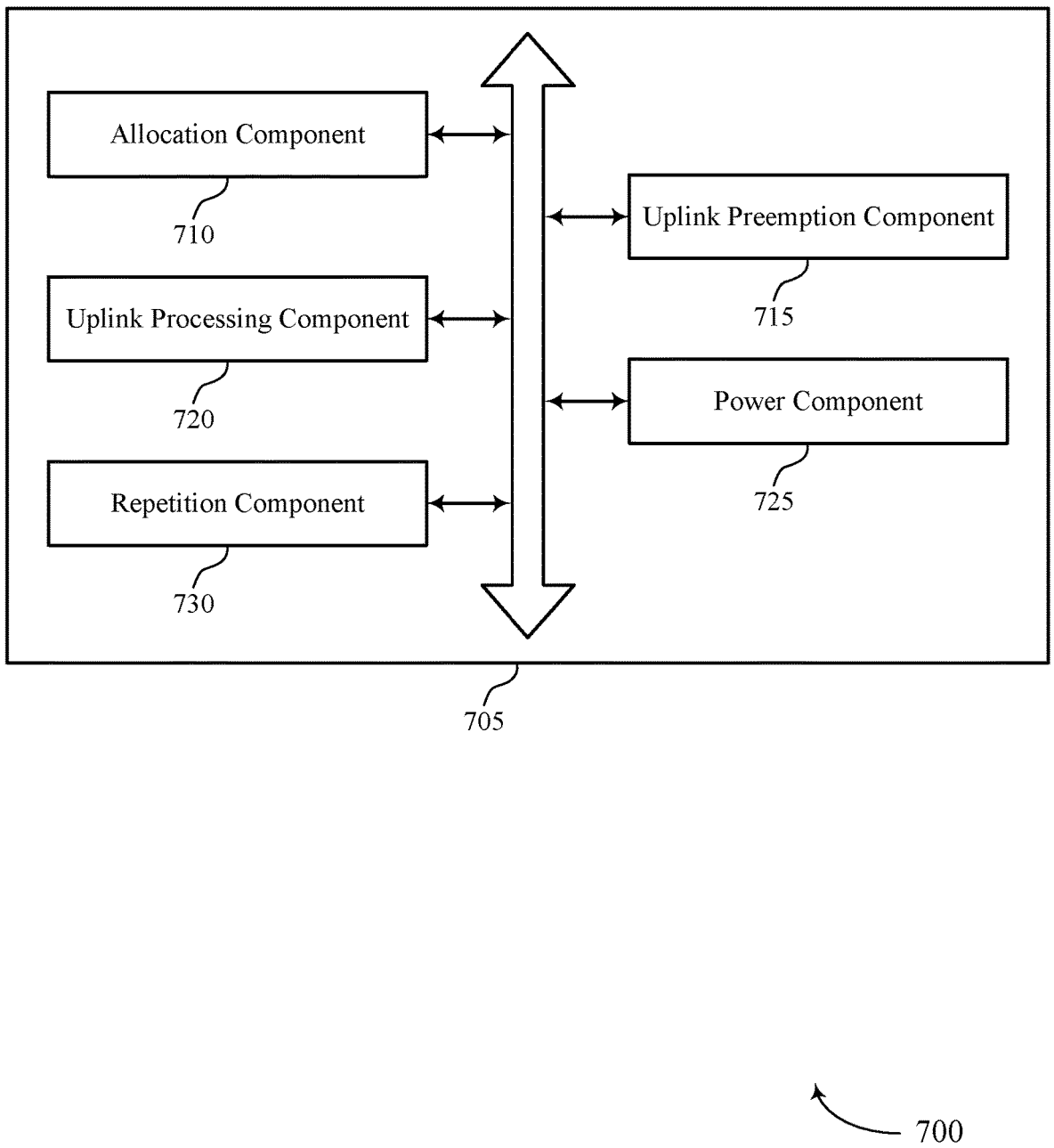
FIG. 7 shows a block diagram of a communications manager that supports uplink preemption indication in accordance with aspects of the present disclosure.

FIG. 7 shows a block diagram 700 of a communications manager 705 that supports uplink preemption indication in accordance with aspects of the present disclosure. The communications manager 705 may be an example of aspects of a communications manager 515, a communications manager 615, or a communications manager 810 described herein. The communications manager 705 may include an allocation component 710, an uplink preemption component 715, an uplink processing component 720, a power component 725, and a repetition component 730. Each of these modules may communicate, directly or indirectly, with one another (e.g., via one or more buses).

The allocation component 710 may receive, from a base station in wireless communication with the UE, an allocation of time and frequency resources for an uplink transmission of a first communication type associated with a threshold reliability or latency metric. In some examples, the allocation component 710 may receive a grant including the allocation of time and frequency resources for the uplink transmission of the first communication type associated with the threshold reliability or latency metric.

The uplink preemption component 715 may monitor, based on receiving the allocation of time and frequency resources for the uplink transmission of the first communication type, a control channel for an uplink preemption indication from the base station, the uplink preemption indication indicating at least one of whether the UE should transmit the uplink transmission using the first communication type associated with the threshold reliability or latency metric or whether an uplink transmission of a second communication type of a second UE is preempted by the uplink transmission of the first communication type of the UE. In some examples, the uplink preemption component 715 may receive the uplink preemption indication based on monitoring the control channel, where processing the uplink transmission is based on receiving the uplink preemption indication. In some examples, the uplink preemption component 715 may determine an absence of the uplink preemption indication on the control channel based on the monitoring, where processing the uplink transmission is based on determining the absence of the uplink preemption indication on the control channel.

The uplink processing component 720 may process the uplink transmission based on monitoring the control channel for the uplink preemption indication. In some examples, the uplink processing component 720 may transmit the uplink transmission using the time and frequency resources allocated based on receiving the uplink preemption indication on the control channel. In some examples, the uplink processing component 720 may transmit the uplink transmission according to the adjusted transmit power. In some examples, the uplink processing component 720 may transmit the uplink transmission according to the adjusted number of uplink transmission repetitions. In some examples, refraining from transmitting the number of uplink transmission repetitions associated with the uplink transmission over the time and frequency resources for the uplink transmission until the uplink preemption indication on the control channel is received, where processing the uplink transmission includes refraining from transmitting the number of uplink transmission repetitions associated with the uplink transmission over the time and frequency resources for the uplink preemption indication.

The uplink processing component 720 may configure a port for the uplink transmission via RRC, where processing the uplink transmission includes transmitting the uplink transmission using the configured port. The uplink processing component 720 may identify a TPMI for the uplink transmission, where processing the uplink transmission includes transmitting the uplink transmission according to the TPMI. In some examples, the uplink processing component 720 may refrain from transmitting the uplink transmission based on determining the absence of the uplink preemption indication on the control channel, where processing the uplink transmission includes refraining transmission of the uplink transmission.

The power component 725 may adjust a transmit power associated with the uplink transmission based on determining the absence of the uplink preemption indication on the control channel, where processing the uplink transmission is based on adjusting the transmit power. The repetition component 730 may adjust a number of uplink transmission repetitions associated with the uplink transmission based on determining the absence of the uplink preemption indication on the control channel, where processing the uplink transmission is based on adjusting the number of uplink transmission repetitions. In some examples, the repetition component 730 may identify a number of uplink transmission repetitions associated with the uplink transmission.

Figure 8:
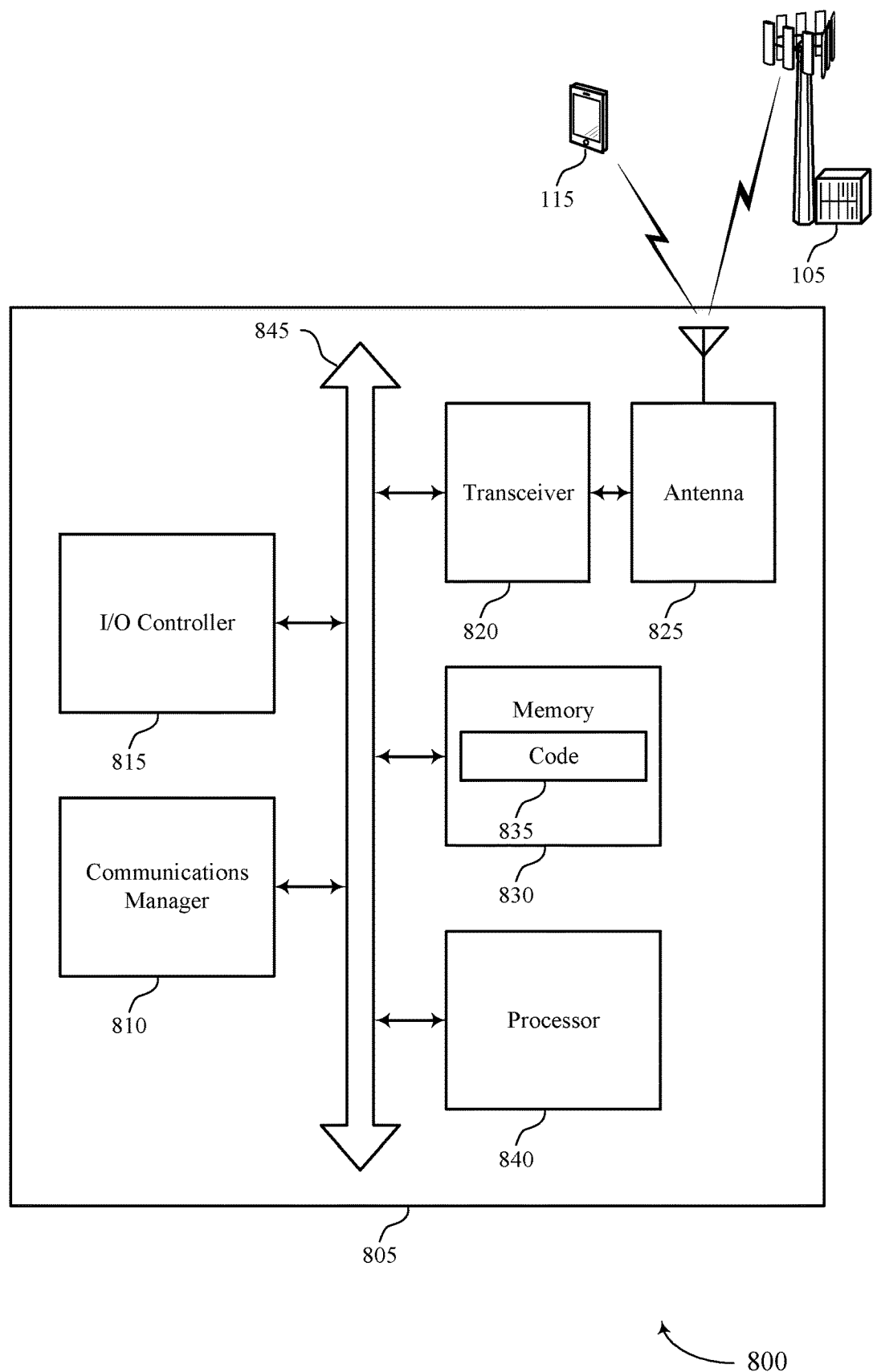
FIG. 8 shows a diagram of a system including a device that supports uplink preemption indication in accordance with aspects of the present disclosure.

FIG. 8 shows a diagram of a system 800 including a device 805 that supports uplink preemption indication in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, from a base station in wireless communication with the device 805, an allocation of time and frequency resources for an uplink transmission of a first communication type associated with a threshold reliability or latency metric, monitor, based on receiving the allocation of time and frequency resources for the uplink transmission of the first communication type, a control channel for an uplink preemption indication from the base station, the uplink preemption indication indicating whether the device 805 should transmit the uplink transmission using the first communication type associated with the threshold reliability or latency metric, and process the uplink transmission based on monitoring the control channel for the uplink preemption indication.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS, ANDROID, MS-DOS, MS-WINDOWS, OS/2, UNIX, LINUX, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas. In some cases, the device 805 may include a single antenna 825. However, in some cases the device 805 may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting uplink preemption indication).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
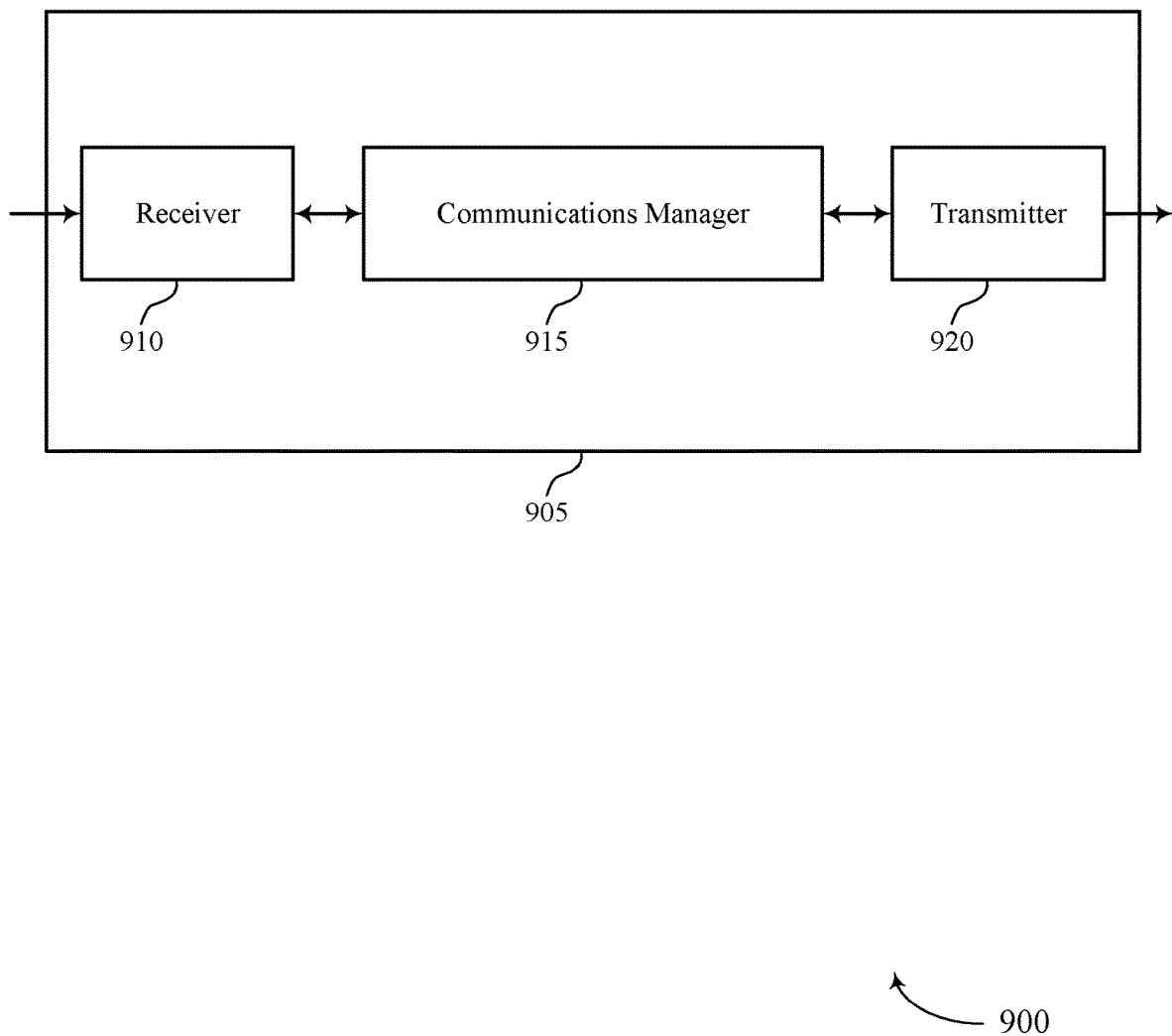
FIGS. 9 and 10 show block diagrams of devices that support uplink preemption indication in accordance with aspects of the present disclosure.

FIG. 9 shows a block diagram 900 of a device 905 that supports uplink preemption indication in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to uplink preemption indication, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive, from a first UE in wireless communication with the device 905, an uplink transmission of a first communication type associated with a threshold reliability or latency metric, determine that the uplink transmission satisfies a threshold of uplink transmission repetitions, and transmit, to a second UE that is in wireless communication of a second communication type with the device 905, an uplink preemption indication indicating whether the UE should transmit the uplink transmission using the first communication type associated with the threshold reliability or latency metric based on the determining. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
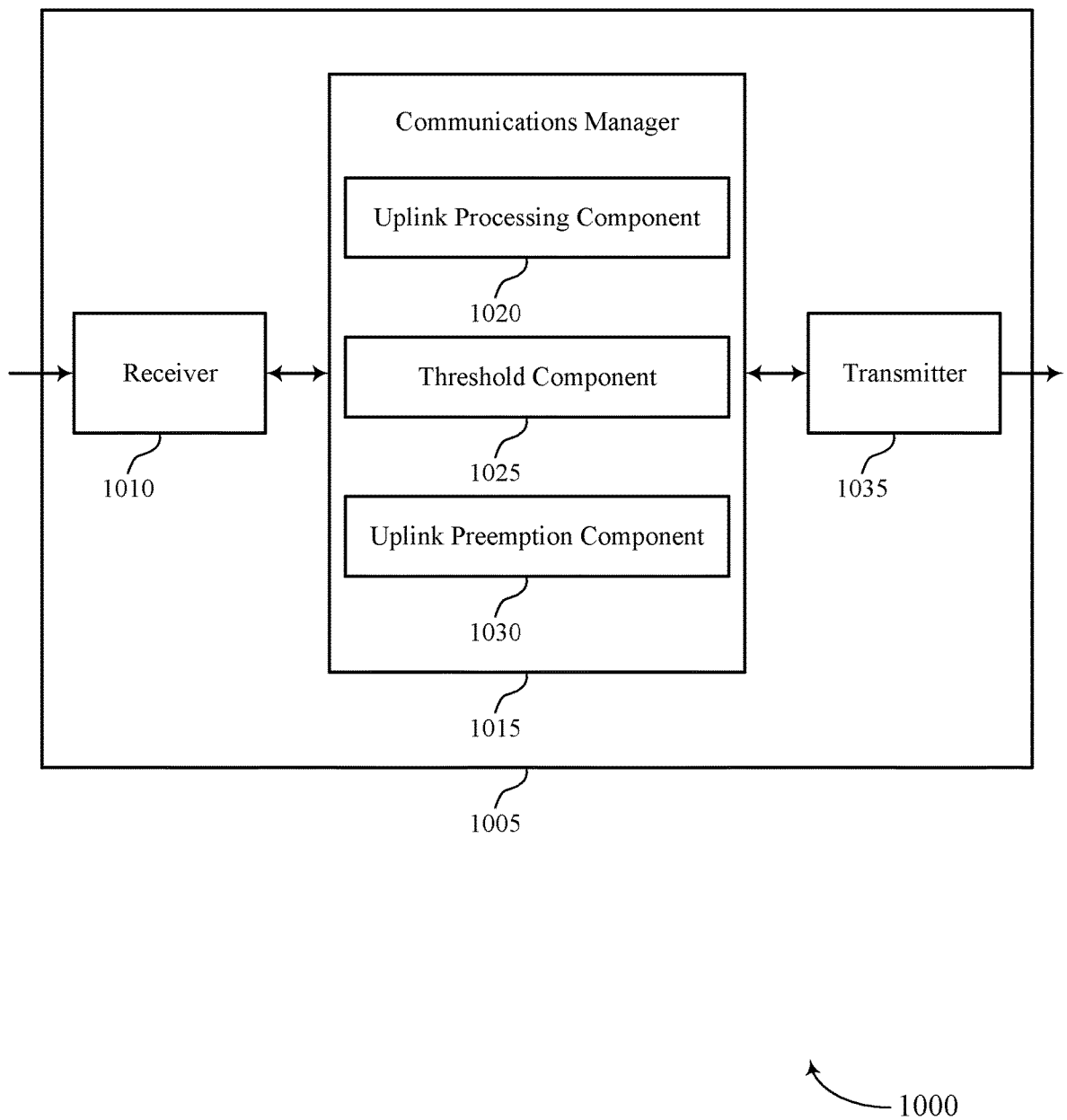

FIG. 10 shows a block diagram 1000 of a device 1005 that supports uplink preemption indication in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to uplink preemption indication, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include an uplink processing component 1020, a threshold component 1025, and an uplink preemption component 1030. The communications manager 1015 may be an example of aspects of the communications manager 1210 described herein.

The uplink processing component 1020 may receive, from a first UE in wireless communication with the device 1005, an uplink transmission of a first communication type associated with a threshold reliability or latency metric. The threshold component 1025 may determine that the uplink transmission satisfies a threshold of uplink transmission repetitions. The uplink preemption component 1030 may transmit, to a second UE that is in wireless communication of a second communication type with the device 1005, an uplink preemption indication indicating at least one of whether the UE should transmit the uplink transmission using the first communication type associated with the threshold reliability or latency metric or whether an uplink transmission of the second communication type is preempted by the uplink transmission of the first communication type based on the determining.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
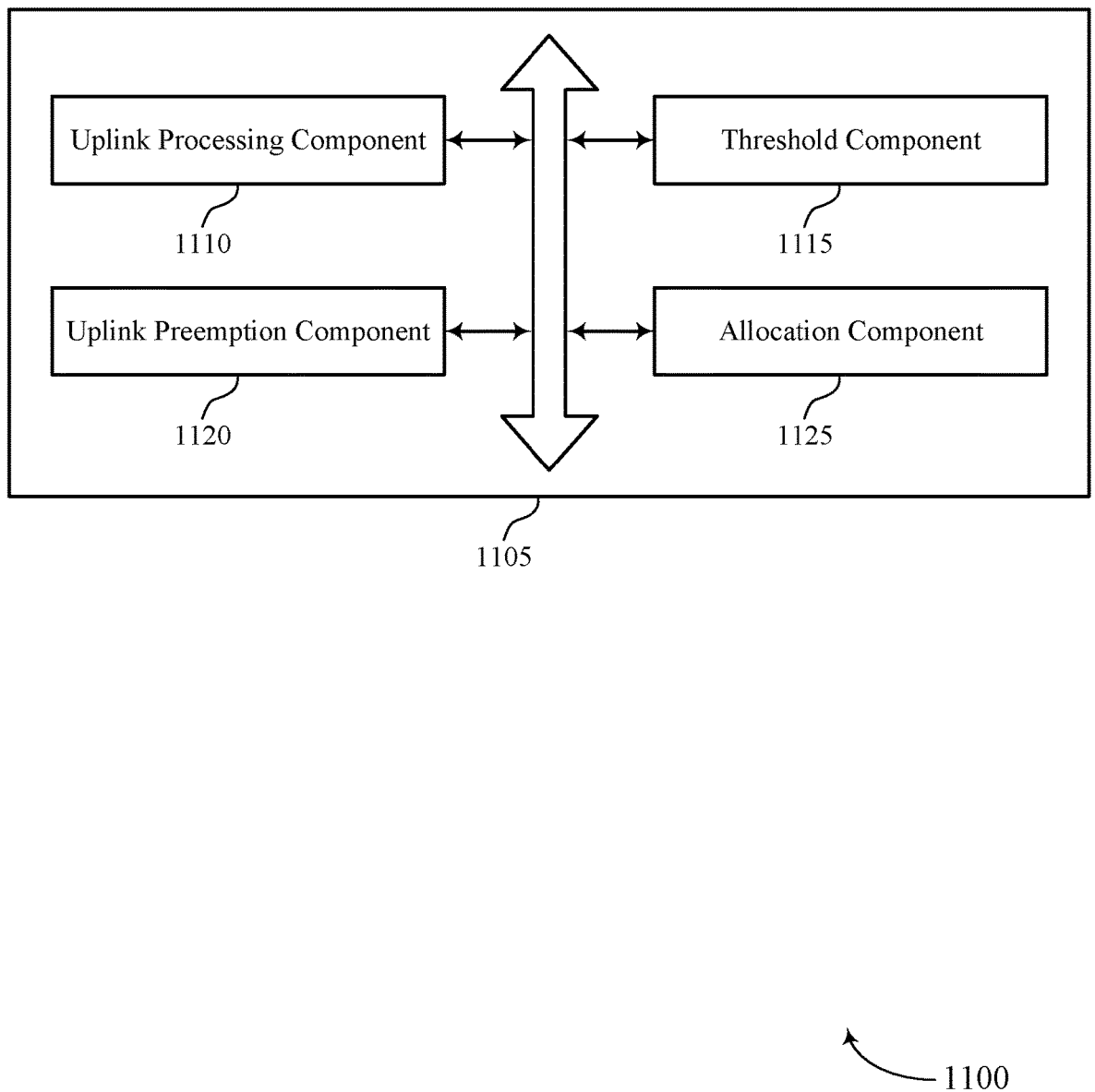
FIG. 11 shows a block diagram of a communications manager that supports uplink preemption indication in accordance with aspects of the present disclosure.

FIG. 11 shows a block diagram 1100 of a communications manager 1105 that supports uplink preemption indication in accordance with aspects of the present disclosure. The communications manager 1105 may be an example of aspects of a communications manager 915, a communications manager 1015, or a communications manager 1210 described herein. The communications manager 1105 may include an uplink processing component 1110, a threshold component 1115, an uplink preemption component 1120, and an allocation component 1125. Each of these modules may communicate, directly or indirectly, with one another (e.g., via one or more buses).

The uplink processing component 1110 may receive, from a first UE in wireless communication with the base station, an uplink transmission of a first communication type associated with a threshold reliability or latency metric. The threshold component 1115 may determine that the uplink transmission satisfies a threshold of uplink transmission repetitions. In some examples, the threshold component 1115 may determine that the uplink transmission is associated with the configured time and frequency resources based on the uplink transmission of the number of uplink transmission repetitions satisfying the threshold of uplink transmission repetitions, where determining that the uplink transmission satisfies the threshold of uplink transmission repetitions is further based on determining that the uplink transmission is associated with the configured time and frequency resources. In some examples, the threshold component 1115 may identify time and frequency resources in which the second UE is to refrain from transmitting the uplink transmission of the second communication type, where the uplink preemption indication indicates the time and frequency resources in which the second UE is to refrain from transmitting.

The uplink preemption component 1120 may transmit, to a second UE that is in wireless communication of a second communication type with the base station, an uplink preemption indication indicating at least one of whether the UE should transmit the uplink transmission using the first communication type associated with the threshold reliability or latency metric or whether an uplink transmission of the second communication type is preempted by the uplink transmission of the first communication type based on the determining.

The allocation component 1125 may configure time and frequency resources of the uplink transmission of the first communication type for the first UE, the uplink transmission including a number of uplink transmission repetitions. In some examples, the allocation component 1125 may transmit, to the first UE, a control message including an indication of the configured time and frequency resources of the uplink transmission of the first communication type, where receiving the uplink transmission of the first communication type is based on the configured time and frequency resources.

Figure 12:
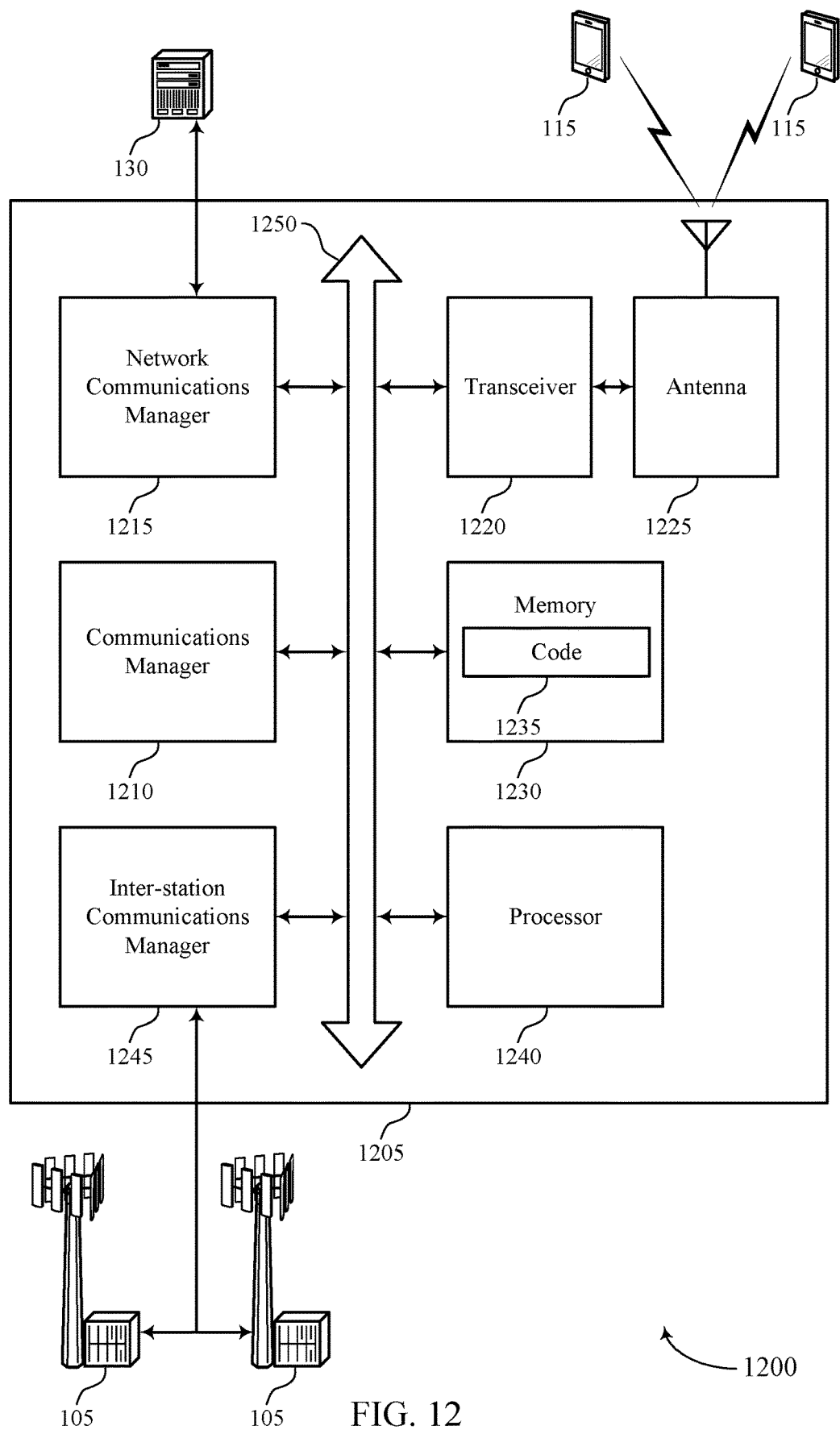
FIG. 12 shows a diagram of a system including a device that supports uplink preemption indication in accordance with aspects of the present disclosure.

FIG. 12 shows a diagram of a system 1200 including a device 1205 that supports uplink preemption indication in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may receive, from a first UE in wireless communication with the device 1205, an uplink transmission of a first communication type associated with a threshold reliability or latency metric, determine that the uplink transmission satisfies a threshold of uplink transmission repetitions, and transmit, to a second UE that is in wireless communication of a second communication type with the device 1205, an uplink preemption indication indicating at least one of whether the UE should transmit the uplink transmission using the first communication type associated with the threshold reliability or latency metric or whether an uplink transmission of the second communication type is preempted by the uplink transmission of the first communication type based on the determining.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas. In some cases, the device 1205 may include a single antenna 1225. However, in some cases the device 1205 may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a basic input/output system (BIOS) which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting uplink preemption indication).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
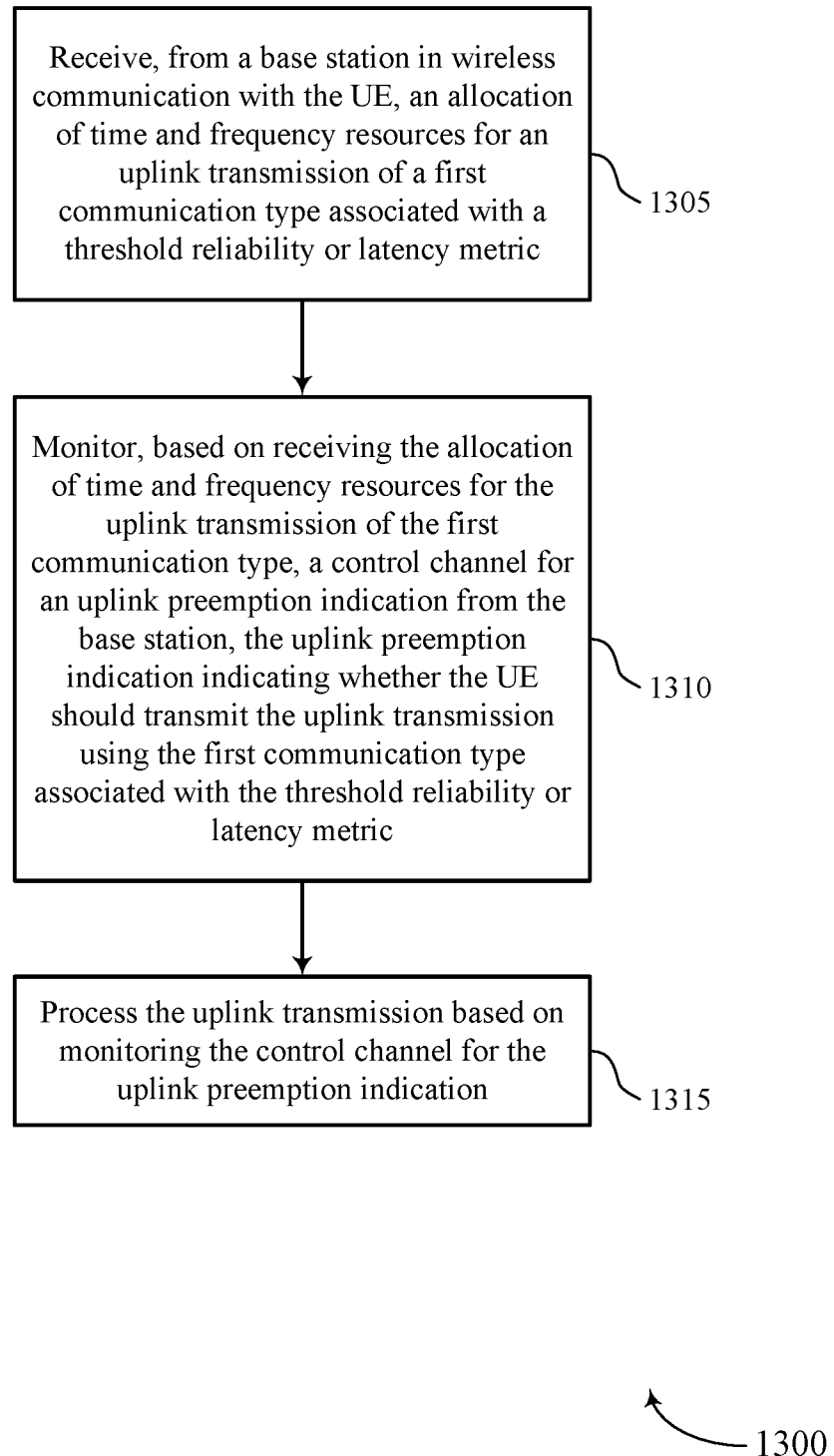
FIGS. 13 through 17 show flowcharts illustrating methods that support uplink preemption indication in accordance with aspects of the present disclosure.

FIG. 13 shows a flowchart illustrating a method 1300 that supports uplink preemption indication in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive, from a base station in wireless communication with the UE, an allocation of time and frequency resources for an uplink transmission of a first communication type associated with a threshold reliability or latency metric. The operations of 1305 may be performed according to the methods described herein. In some examples, aspects of the operations of 1305 may be performed by an allocation component as described with reference to FIGS. 5 through 8.

At 1310, the UE may monitor, based on receiving the allocation of time and frequency resources for the uplink transmission of the first communication type, a control channel for an uplink preemption indication from the base station, the uplink preemption indication indicating whether the UE should transmit the uplink transmission using the first communication type associated with the threshold reliability or latency metric. The operations of 1310 may be performed according to the methods described herein. In some examples, aspects of the operations of 1310 may be performed by an uplink preemption component as described with reference to FIGS. 5 through 8.

At 1315, the UE may process the uplink transmission based on monitoring the control channel for the uplink preemption indication. The operations of 1315 may be performed according to the methods described herein. In some examples, aspects of the operations of 1315 may be performed by an uplink processing component as described with reference to FIGS. 5 through 8.

Figure 14:
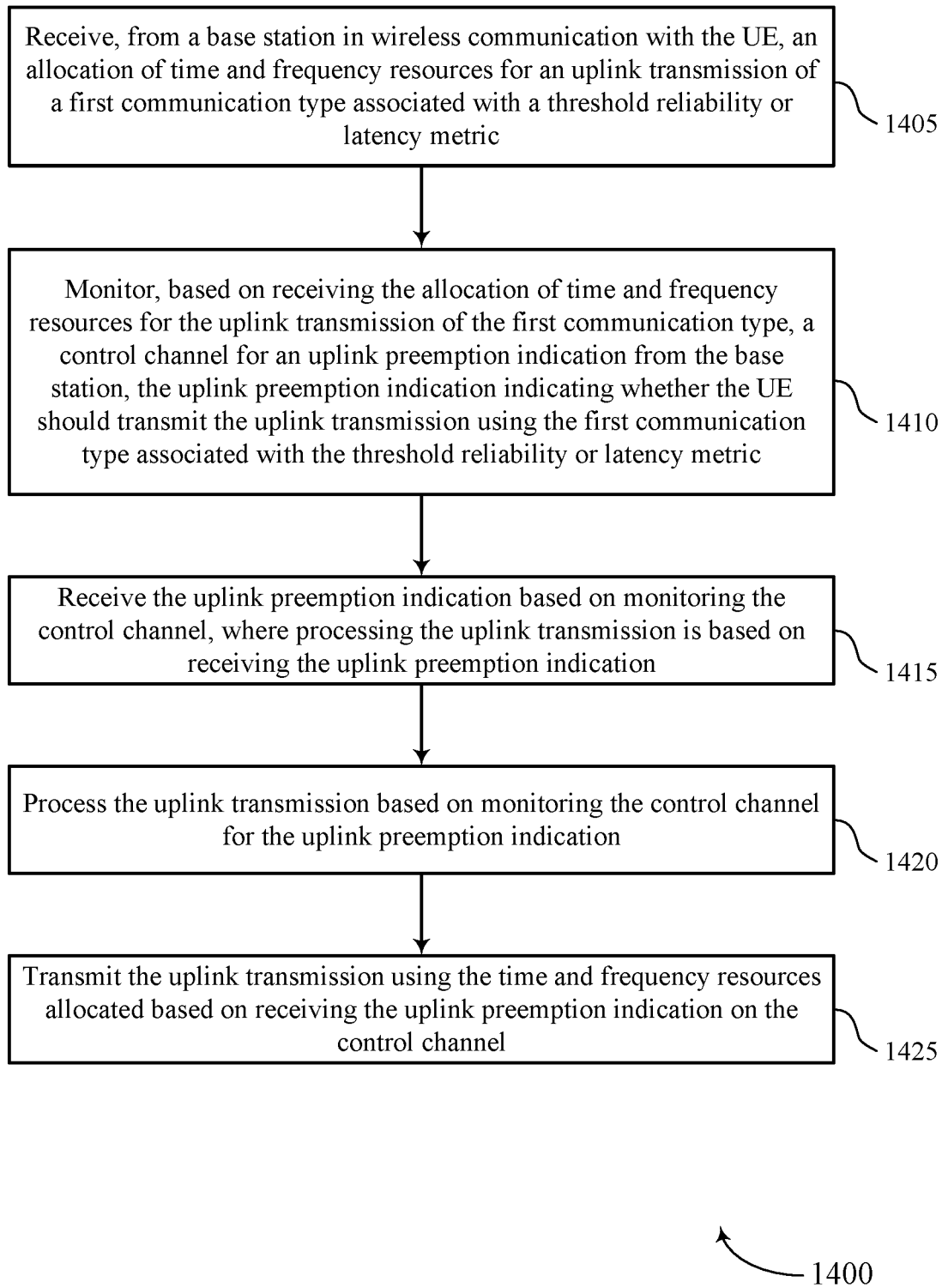

FIG. 14 shows a flowchart illustrating a method 1400 that supports uplink preemption indication in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station in wireless communication with the UE, an allocation of time and frequency resources for an uplink transmission of a first communication type associated with a threshold reliability or latency metric. The operations of 1405 may be performed according to the methods described herein. In some examples, aspects of the operations of 1405 may be performed by an allocation component as described with reference to FIGS. 5 through 8.

At 1410, the UE may monitor, based on receiving the allocation of time and frequency resources for the uplink transmission of the first communication type, a control channel for an uplink preemption indication from the base station, the uplink preemption indication indicating whether the UE should transmit the uplink transmission using the first communication type associated with the threshold reliability or latency metric. The operations of 1410 may be performed according to the methods described herein. In some examples, aspects of the operations of 1410 may be performed by an uplink preemption component as described with reference to FIGS. 5 through 8.

At 1415, the UE may receive the uplink preemption indication based on monitoring the control channel, where processing the uplink transmission is based on receiving the uplink preemption indication. The operations of 1415 may be performed according to the methods described herein. In some examples, aspects of the operations of 1415 may be performed by an uplink preemption component as described with reference to FIGS. 5 through 8.

At 1420, the UE may process the uplink transmission based on monitoring the control channel for the uplink preemption indication. The operations of 1420 may be performed according to the methods described herein. In some examples, aspects of the operations of 1420 may be performed by an uplink processing component as described with reference to FIGS. 5 through 8.

At 1425, the UE may transmit the uplink transmission using the time and frequency resources allocated based on receiving the uplink preemption indication on the control channel. The operations of 1425 may be performed according to the methods described herein. In some examples, aspects of the operations of 1425 may be performed by an uplink processing component as described with reference to FIGS. 5 through 8.

Figure 15:
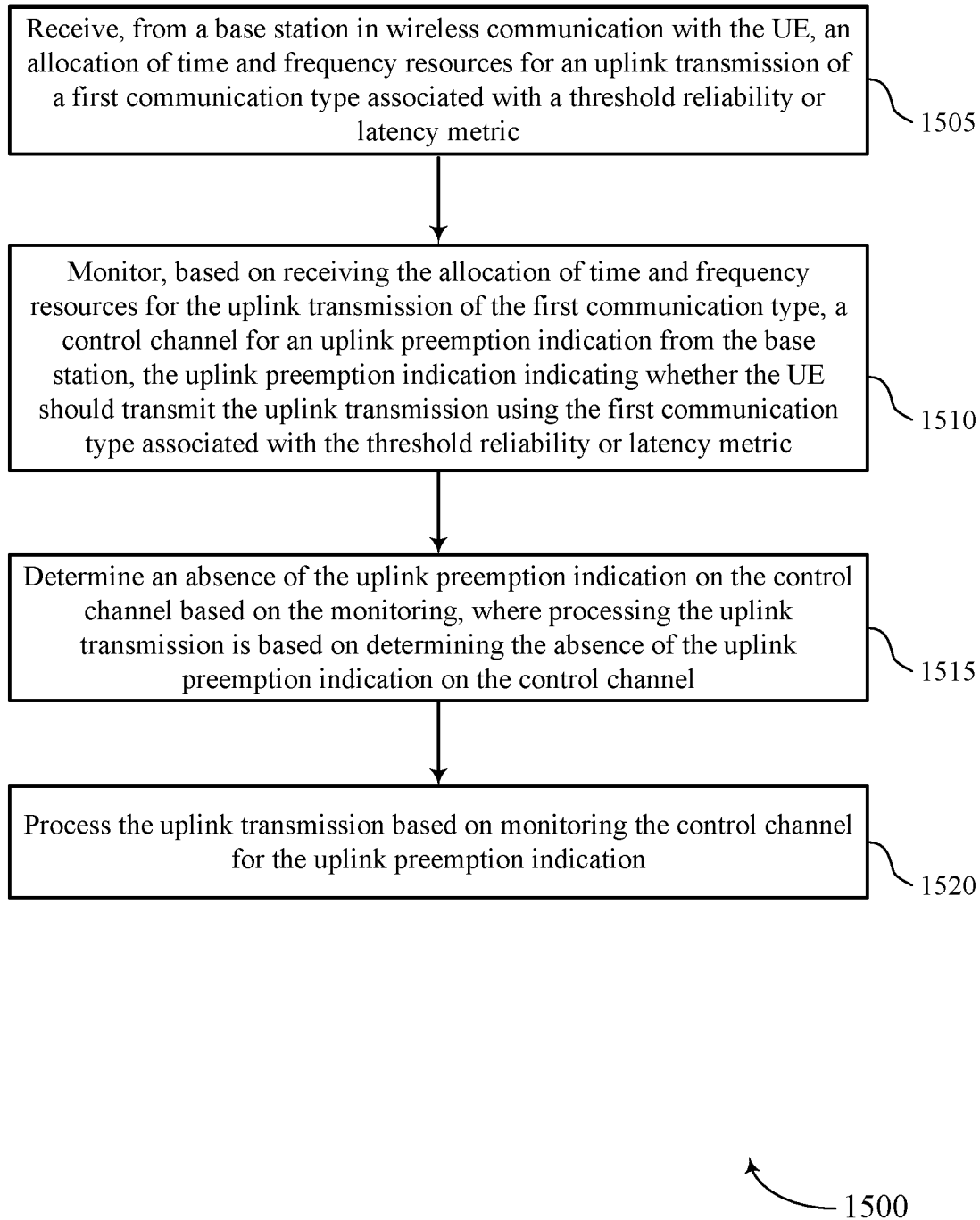

FIG. 15 shows a flowchart illustrating a method 1500 that supports uplink preemption indication in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station in wireless communication with the UE, an allocation of time and frequency resources for an uplink transmission of a first communication type associated with a threshold reliability or latency metric. The operations of 1505 may be performed according to the methods described herein. In some examples, aspects of the operations of 1505 may be performed by an allocation component as described with reference to FIGS. 5 through 8.

At 1510, the UE may monitor, based on receiving the allocation of time and frequency resources for the uplink transmission of the first communication type, a control channel for an uplink preemption indication from the base station, the uplink preemption indication indicating whether the UE should transmit the uplink transmission using the first communication type associated with the threshold reliability or latency metric. The operations of 1510 may be performed according to the methods described herein. In some examples, aspects of the operations of 1510 may be performed by an uplink preemption component as described with reference to FIGS. 5 through 8.

At 1515, the UE may determine an absence of the uplink preemption indication on the control channel based on the monitoring. The operations of 1515 may be performed according to the methods described herein. In some examples, aspects of the operations of 1515 may be performed by an uplink preemption component as described with reference to FIGS. 5 through 8.

At 1520, the UE may process the uplink transmission based on monitoring the control channel for the uplink preemption indication. In some cases, processing the uplink transmission is based on determining the absence of the uplink preemption indication on the control channel. The operations of 1520 may be performed according to the methods described herein. In some examples, aspects of the operations of 1520 may be performed by an uplink processing component as described with reference to FIGS. 5 through 8.

Figure 16:
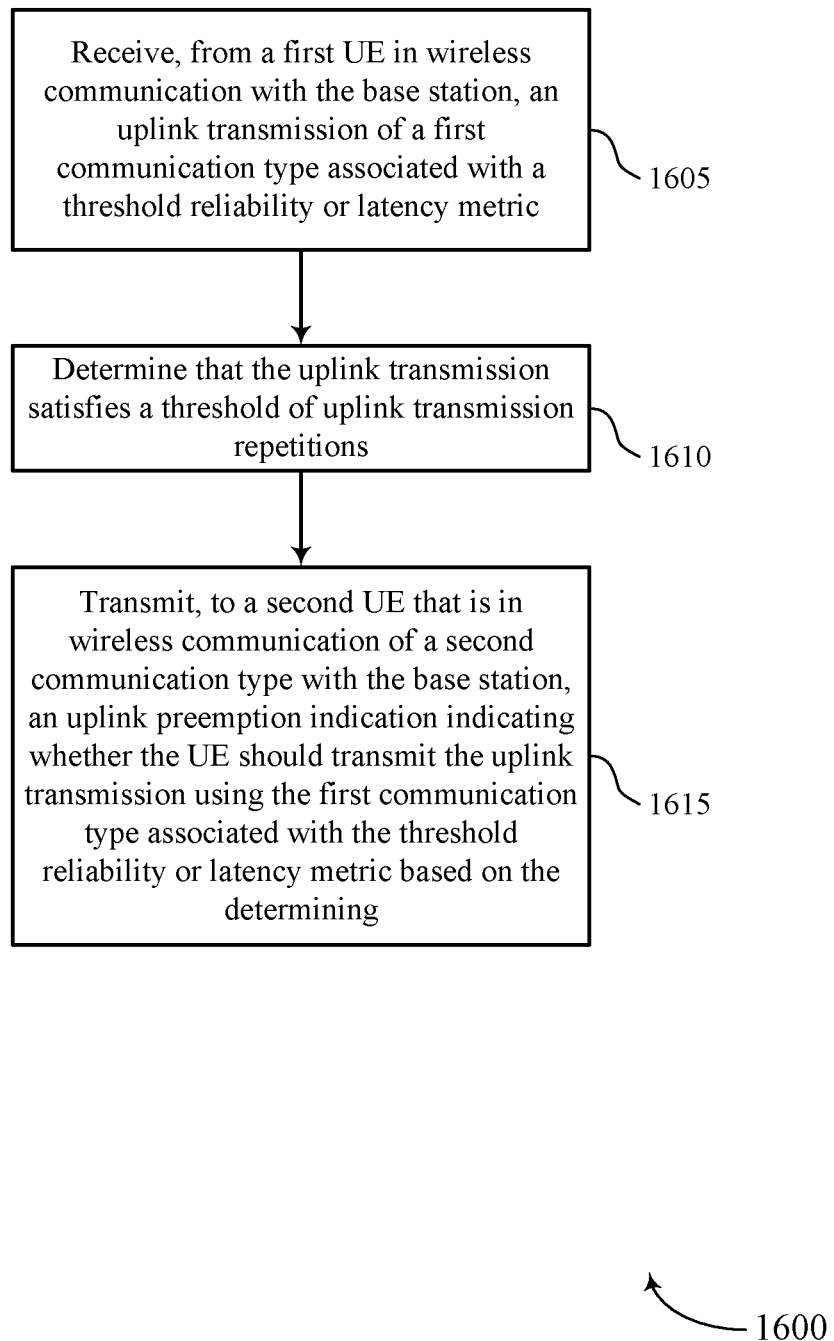

FIG. 16 shows a flowchart illustrating a method 1600 that supports uplink preemption indication in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may receive, from a first UE in wireless communication with the base station, an uplink transmission of a first communication type associated with a threshold reliability or latency metric. The operations of 1605 may be performed according to the methods described herein. In some examples, aspects of the operations of 1605 may be performed by an uplink processing component as described with reference to FIGS. 9 through 12.

At 1610, the base station may determine that the uplink transmission satisfies a threshold of uplink transmission repetitions. The operations of 1610 may be performed according to the methods described herein. In some examples, aspects of the operations of 1610 may be performed by a threshold component as described with reference to FIGS. 9 through 12.

At 1615, the base station may transmit, to a second UE that is in wireless communication of a second communication type with the base station, an uplink preemption indication indicating whether the UE should transmit the uplink transmission using the first communication type associated with the threshold reliability or latency metric based on the determining. The operations of 1615 may be performed according to the methods described herein. In some examples, aspects of the operations of 1615 may be performed by an uplink preemption component as described with reference to FIGS. 9 through 12.

Figure 17:
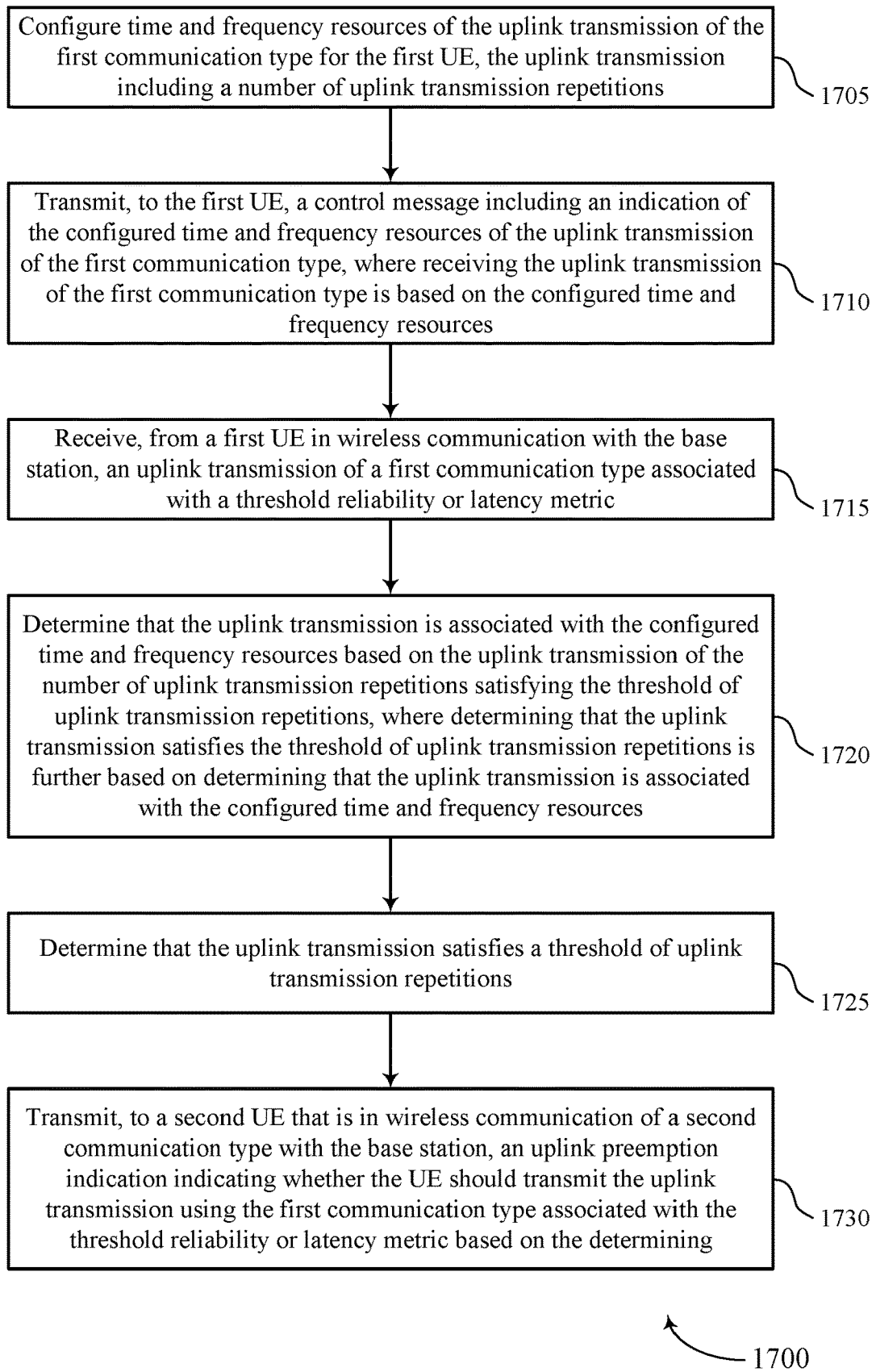

FIG. 17 shows a flowchart illustrating a method 1700 that supports uplink preemption indication in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may configure time and frequency resources of the uplink transmission of the first communication type for the first UE, the uplink transmission including a number of uplink transmission repetitions. The operations of 1705 may be performed according to the methods described herein. In some examples, aspects of the operations of 1705 may be performed by an allocation component as described with reference to FIGS. 9 through 12.

At 1710, the base station may transmit, to the first UE, a control message including an indication of the configured time and frequency resources of the uplink transmission of the first communication type, where receiving the uplink transmission of the first communication type is based on the configured time and frequency resources. The operations of 1710 may be performed according to the methods described herein. In some examples, aspects of the operations of 1710 may be performed by an allocation component as described with reference to FIGS. 9 through 12.

At 1715, the base station may receive, from a first UE in wireless communication with the base station, an uplink transmission of a first communication type associated with a threshold reliability or latency metric. The operations of 1715 may be performed according to the methods described herein. In some examples, aspects of the operations of 1715 may be performed by an uplink processing component as described with reference to FIGS. 9 through 12.

At 1720, the base station may determine that the uplink transmission is associated with the configured time and frequency resources based on the uplink transmission of the number of uplink transmission repetitions satisfying the threshold of uplink transmission repetitions. The operations of 1720 may be performed according to the methods described herein. In some examples, aspects of the operations of 1720 may be performed by a threshold component as described with reference to FIGS. 9 through 12.

At 1725, the base station may determine that the uplink transmission satisfies a threshold of uplink transmission repetitions. In some cases, determining that the uplink transmission satisfies the threshold of uplink transmission repetitions is further based on determining that the uplink transmission is associated with the configured time and frequency resources. The operations of 1725 may be performed according to the methods described herein. In some examples, aspects of the operations of 1725 may be performed by a threshold component as described with reference to FIGS. 9 through 12.

At 1730, the base station may transmit, to a second UE that is in wireless communication of a second communication type with the base station, an uplink preemption indication indicating whether the UE should transmit the uplink transmission using the first communication type associated with the threshold reliability or latency metric based on the determining. The operations of 1730 may be performed according to the methods described herein. In some examples, aspects of the operations of 1730 may be performed by an uplink preemption component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
receiving, from a network access node in wireless communication with the UE, an allocation of time and frequency resources for an uplink transmission of a first communication type associated with a threshold reliability or latency metric;
monitoring, based at least in part on receiving the allocation of time and frequency resources for the uplink transmission of the first communication type, a control channel for an uplink preemption indication indicating whether an uplink transmission of a second communication type of a second UE is preempted by the uplink transmission of the first communication type, from the network access node, the uplink preemption indication indicating whether the UE should transmit the uplink transmission using the first communication type associated with the threshold reliability or latency metric; and
processing the uplink transmission based at least in part on monitoring the control channel for the uplink preemption indication.

2. The method of claim 1, further comprising:
receiving the uplink preemption indication based at least in part on monitoring the control channel, wherein processing the uplink transmission is based at least in part on receiving the uplink preemption indication; and
transmitting the uplink transmission using the time and frequency resources allocated based at least in part on receiving the uplink preemption indication on the control channel.

3. The method of claim 1, further comprising:
determining an absence of the uplink preemption indication on the control channel based at least in part on the monitoring, wherein processing the uplink transmission is based at least in part on determining the absence of the uplink preemption indication on the control channel.

4. The method of claim 3, further comprising:
adjusting a transmit power associated with the uplink transmission based at least in part on determining the absence of the uplink preemption indication on the control channel, wherein processing the uplink transmission is based at least in part on adjusting the transmit power; and
transmitting the uplink transmission according to the adjusted transmit power.

5. The method of claim 4, wherein the transmit power is signaled to the UE via radio resource control (RRC) signaling.

6. The method of claim 3, further comprising:
adjusting a number of uplink transmission repetitions associated with the uplink transmission based at least in part on determining the absence of the uplink preemption indication on the control channel, wherein processing the uplink transmission is based at least in part on adjusting the number of uplink transmission repetitions; and
transmitting the uplink transmission according to the adjusted number of uplink transmission repetitions.

7. The method of claim 3, further comprising:
identifying a number of uplink transmission repetitions associated with the uplink transmission; and
refraining from transmitting the number of uplink transmission repetitions associated with the uplink transmission over the time and frequency resources for the uplink transmission until the uplink preemption indication on the control channel is received, wherein processing the uplink transmission comprises refraining from transmitting the number of uplink transmission repetitions associated with the uplink transmission over the time and frequency resources for the uplink transmission until the uplink preemption indication on the control channel is received.

8. The method of claim 3, further comprising:
configuring a port for the uplink transmission via radio resource control (RRC), wherein processing the uplink transmission comprises transmitting the uplink transmission using the configured port.

9. The method of claim 3, further comprising:
identifying a transmission precoding matrix indication (TPMI) for the uplink transmission, wherein processing the uplink transmission comprises transmitting the uplink transmission according to the TPMI.

10. The method of claim 3, further comprising:
refraining from transmitting the uplink transmission based at least in part on determining the absence of the uplink preemption indication on the control channel, wherein processing the uplink transmission comprises refraining transmission of the uplink transmission.

11. The method of claim 1, wherein receiving the allocation of time and frequency resources for the uplink transmission of the first communication type comprises:
receiving a grant comprising the allocation of time and frequency resources for the uplink transmission of the first communication type associated with the threshold reliability or latency metric.

12. The method of claim 1, wherein the control channel for monitoring the uplink preemption indication by the UE is different than a second control channel for monitoring a second uplink preemption indication by the second UE of the second communication type.

13. The method of claim 1, wherein the control channel for monitoring the uplink preemption indication by the UE is a same control channel for monitoring a second uplink preemption indication by the second UE of the second communication type.

14. The method of claim 1, wherein the first communication type comprises ultra-reliable low latency communications (URLLC), and the second communication type comprises at least one of machine-type communications (MTC), mobile broadband (MBB) communications, or enhanced MBB (eMBB) communications.

15. A method for wireless communications at a network access node, comprising:
receiving, from a first user equipment (UE) in wireless communication with the network access node, an uplink transmission of a first communication type associated with a threshold reliability or latency metric;
determining that the uplink transmission satisfies a threshold of uplink transmission repetitions; and
transmitting, to a second UE that is in wireless communication of a second communication type with the network access node, an uplink preemption indication indicating whether an uplink transmission of the second communication type of the second UE is preempted by the uplink transmission of the first communication type and whether the second UE should transmit the uplink transmission using the second communication type.

16. The method of claim 15, further comprising:
configuring time and frequency resources of the uplink transmission of the first communication type for the first UE, the uplink transmission comprising a number of uplink transmission repetitions; and
transmitting, to the first UE, a control message comprising an indication of the configured time and frequency resources of the uplink transmission of the first communication type, wherein receiving the uplink transmission of the first communication type is based at least in part on the configured time and frequency resources.

17. The method of claim 16, further comprising:
determining that the uplink transmission is associated with the configured time and frequency resources based at least in part on the uplink transmission of the number of uplink transmission repetitions satisfying the threshold of uplink transmission repetitions, wherein determining that the uplink transmission satisfies the threshold of uplink transmission repetitions is further based at least in part on determining that the uplink transmission is associated with the configured time and frequency resources.

18. The method of claim 17, further comprising:
identifying time and frequency resources in which the second UE is to refrain from transmitting the uplink transmission of the second communication type, wherein the uplink preemption indication indicates the time and frequency resources in which the second UE is to refrain from transmitting.

19. The method of claim 15, wherein the threshold of uplink transmission repetitions comprises at least one uplink transmission.

20. The method of claim 15, wherein the uplink preemption indication comprises a radio resource control (RRC) message.

21. The method of claim 15, wherein the uplink preemption indication comprises a downlink control information (DCI) message.

22. The method of claim 15, wherein the first communication type comprises ultra-reliable, low latency communications (URLLC).

23. The method of claim 15, wherein the second communication type comprises machine-type communications (MTC), mobile broadband (MBB) communications, or enhanced MBB (eMBB) communications.

24. An apparatus for wireless communications, comprising:
a processor,
memory in electronic communication with the processor; and
instructions stored in the memory and executable by the processor to cause the apparatus to:
receive, from a network access node in wireless communication with the apparatus, an allocation of time and frequency resources for an uplink transmission of a first communication type associated with a threshold reliability or latency metric;
monitor, based at least in part on receiving the allocation of time and frequency resources for the uplink transmission of the first communication type, a control channel for an uplink preemption indication indicating whether an uplink transmission of a second communication type of a second apparatus is preempted by the uplink transmission of the first communication type, from the network access node, the uplink preemption indication indicating whether the apparatus should transmit the uplink transmission using the first communication type associated with the threshold reliability or latency metric; and
process the uplink transmission based at least in part on monitoring the control channel for the uplink preemption indication.

25. An apparatus for wireless communications, comprising:
a processor,
memory in electronic communication with the processor; and
instructions stored in the memory and executable by the processor to cause the apparatus to:
receive, from a first user equipment (UE) in wireless communication with the apparatus, an uplink transmission of a first communication type associated with a threshold reliability or latency metric;
determine that the uplink transmission satisfies a threshold of uplink transmission repetitions; and
transmit, to a second UE that is in wireless communication of a second communication type with the apparatus, an uplink preemption indication indicating whether an uplink transmission of the second communication type of the second UE is preempted by the uplink transmission of the first communication type and whether the second UE should transmit the uplink transmission using the second communication type.

26. An apparatus for wireless communications, comprising:
means for receiving, from a network access node in wireless communication with the apparatus, an allocation of time and frequency resources for an uplink transmission of a first communication type associated with a threshold reliability or latency metric;
means for monitoring, based at least in part on receiving the allocation of time and frequency resources for the uplink transmission of the first communication type, a control channel for an uplink preemption indication indicating whether an uplink transmission of a second communication type of a second apparatus is preempted by the uplink transmission of the first communication type, from the network access node, the uplink preemption indication indicating whether the apparatus should transmit the uplink transmission using the first communication type associated with the threshold reliability; and
means for processing the uplink transmission based at least in part on monitoring the control channel for the uplink preemption indication.

27. An apparatus for wireless communications, comprising:
means for receiving, from a first user equipment (UE) in wireless communication with the apparatus, an uplink transmission of a first communication type associated with a threshold reliability or latency metric;
means for determining that the uplink transmission satisfies a threshold of uplink transmission repetitions; and
means for transmitting, to a second UE that is in wireless communication of a second communication type with the apparatus, an uplink preemption indication indicating whether an uplink transmission of the second communication type of the second UE is preempted by the uplink transmission of the first communication type and whether the second UE should transmit the uplink transmission using the second communication type.

28. A non-transitory computer-readable medium storing code for wireless communications at a user equipment (UE), the code comprising instructions executable by a processor to:
receive, from a network access node in wireless communication with the UE, an allocation of time and frequency resources for an uplink transmission of a first communication type associated with a threshold reliability or latency metric;
monitor, based at least in part on receiving the allocation of time and frequency resources for the uplink transmission of the first communication type, a control channel for an uplink preemption indication indicating whether an uplink transmission of a second communication type of a second UE is preempted by the uplink transmission of the first communication type, from the network access node, the uplink preemption indication indicating whether the UE should transmit the uplink transmission using the first communication type associated with the threshold reliability; and
process the uplink transmission based at least in part on monitoring the control channel for the uplink preemption indication.

29. A non-transitory computer-readable medium storing code for wireless communications at a network access node, the code comprising instructions executable by a processor to:
receive, from a first user equipment (UE) in wireless communication with the network access node, an uplink transmission of a first communication type associated with a threshold reliability or latency metric;
determine that the uplink transmission satisfies a threshold of uplink transmission repetitions; and
transmit, to a second UE that is in wireless communication of a second communication type with the network access node, an uplink preemption indication indicating whether an uplink transmission of the second communication type of the second UE is preempted by the uplink transmission of the first communication type and whether the second UE should transmit the uplink transmission using the second communication type.

* * * * *